(12) United States Patent
Murashita et al.

(10) Patent No.: US 8,774,495 B2
(45) Date of Patent: Jul. 8, 2014

(54) IMAGE SYNTHESIZING APPARATUS AND METHOD OF SYNTHESIZING IMAGES

(75) Inventors: Kimitaka Murashita, Kawasaki (JP); Masayoshi Shimizu, Kawasaki (JP); Kaoru Chujo, Kawasaki (JP); Yasuhiro Kawakatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 733 days.

(21) Appl. No.: 12/724,871

(22) Filed: Mar. 16, 2010

(65) Prior Publication Data

US 2010/0172585 A1 Jul. 8, 2010

Related U.S. Application Data

(63) Continuation of application No. PCT/JP2007/001038, filed on Sep. 25, 2007.

(51) Int. Cl.
*G06K 9/00* (2006.01)
*G06K 9/20* (2006.01)
*G06K 9/36* (2006.01)
*G06K 9/32* (2006.01)
*G01C 3/14* (2006.01)

(52) U.S. Cl.
USPC ........... 382/154; 382/165; 382/282; 382/284; 382/294; 356/12

(58) Field of Classification Search
None
See application file for complete search history.

(56) References Cited

U.S. PATENT DOCUMENTS

| | | | |
|---|---|---|---|
| 6,549,681 B1 * | 4/2003 | Takiguchi et al. | 382/294 |
| 7,623,733 B2 | 11/2009 | Hirosawa | |
| 2003/0206653 A1 * | 11/2003 | Katayama et al. | 382/154 |
| 2004/0075749 A1 * | 4/2004 | Kondo et al. | 348/222.1 |
| 2006/0078224 A1 * | 4/2006 | Hirosawa | 382/284 |
| 2007/0098300 A1 * | 5/2007 | Komiya et al. | 382/284 |

FOREIGN PATENT DOCUMENTS

| | | |
|---|---|---|
| JP | 9-93431 | 4/1997 |
| JP | 10-105677 | 4/1998 |
| JP | 2000-316125 | 11/2000 |
| JP | 2004-72685 | 3/2004 |

OTHER PUBLICATIONS

International Search Report mailed Nov. 13, 2007 in corresponding PCT/JP2007/001038.

* cited by examiner

*Primary Examiner* — Vu Le
*Assistant Examiner* — Kenny Cese
(74) *Attorney, Agent, or Firm* — Staas & Halsey LLP

(57) ABSTRACT

When a plurality of images are to be overlapped and synthesized, coincidence degrees between the plurality of images in an area near the boundary of a common area are calculated, and the plurality of images are overlapped and synthesized so that an area near the boundary having a high coincidence degree appears on the overlapped image. Thereby, it is possible to avoid the duplexing of the subject in the common area and unnatural ruptures on the boundary made by the overlapping while reducing the number of processes for the synthesizing.

16 Claims, 26 Drawing Sheets

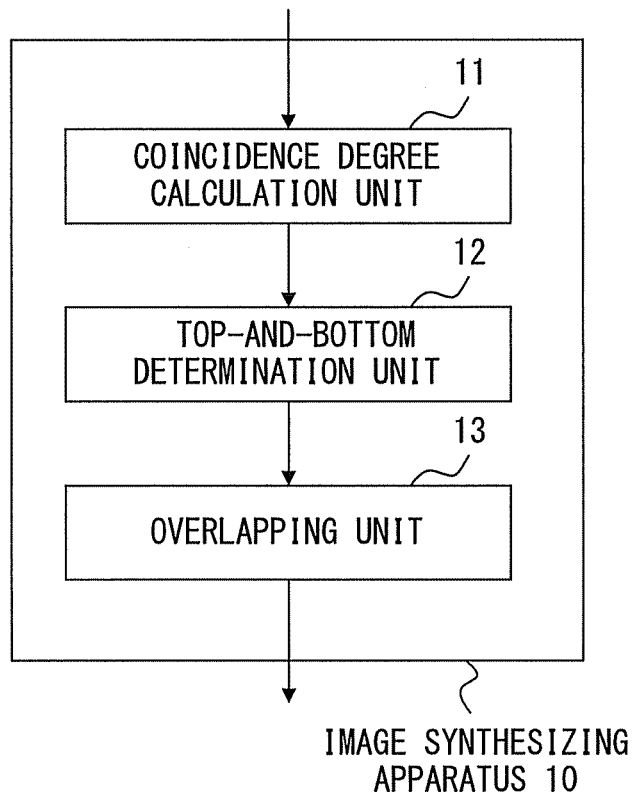
F I G. 1

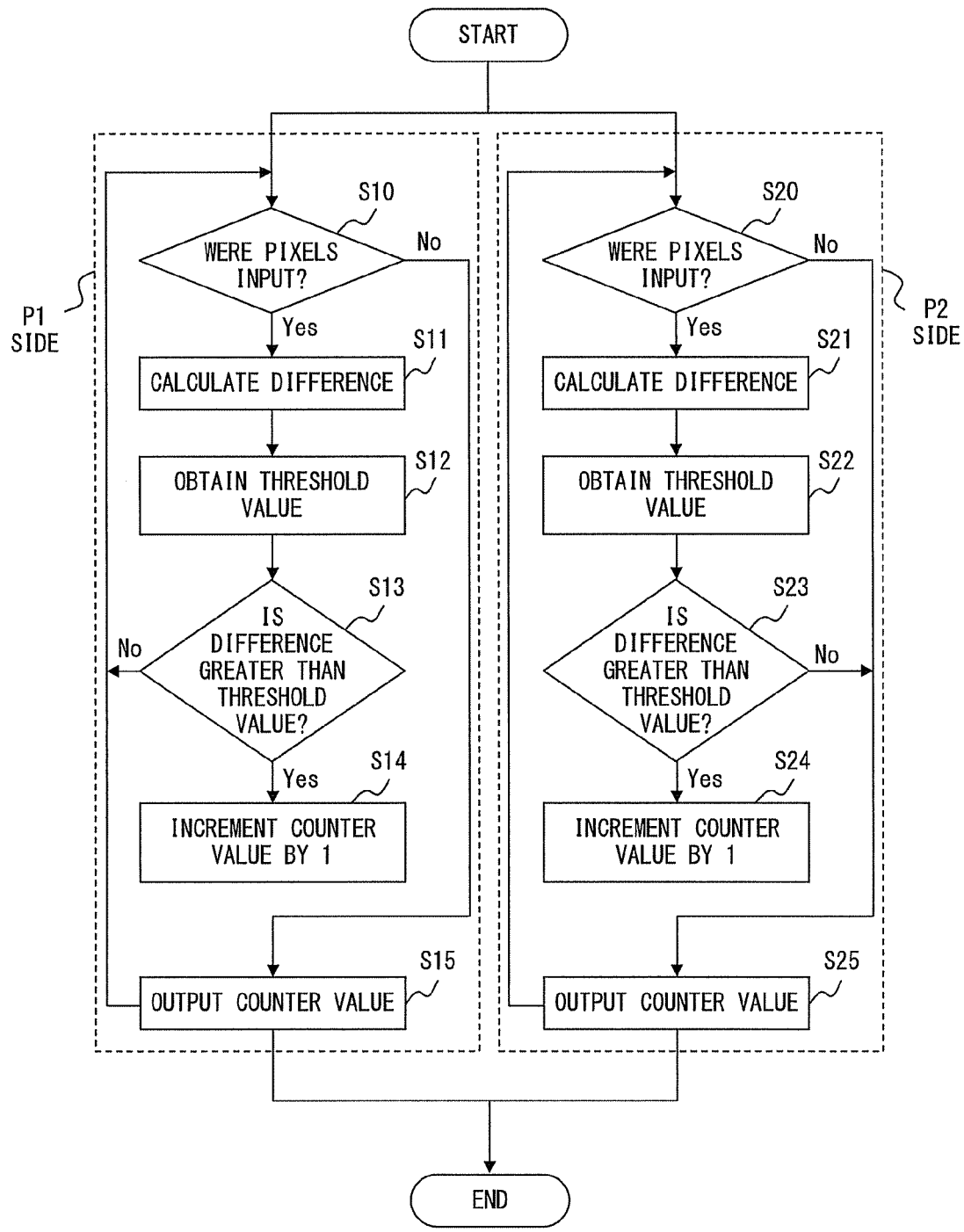
F I G. 6

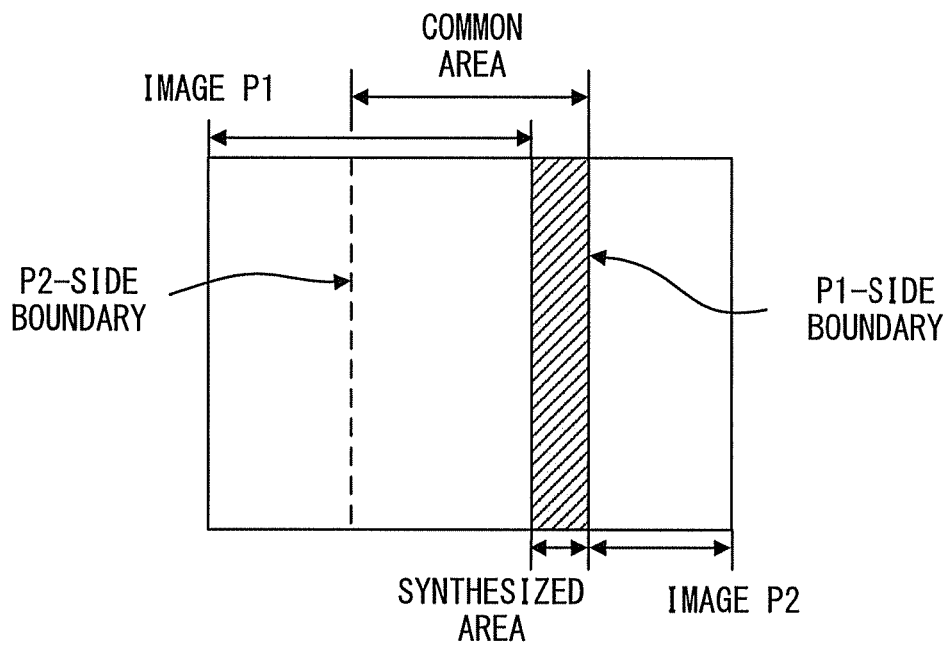
F I G. 9 A

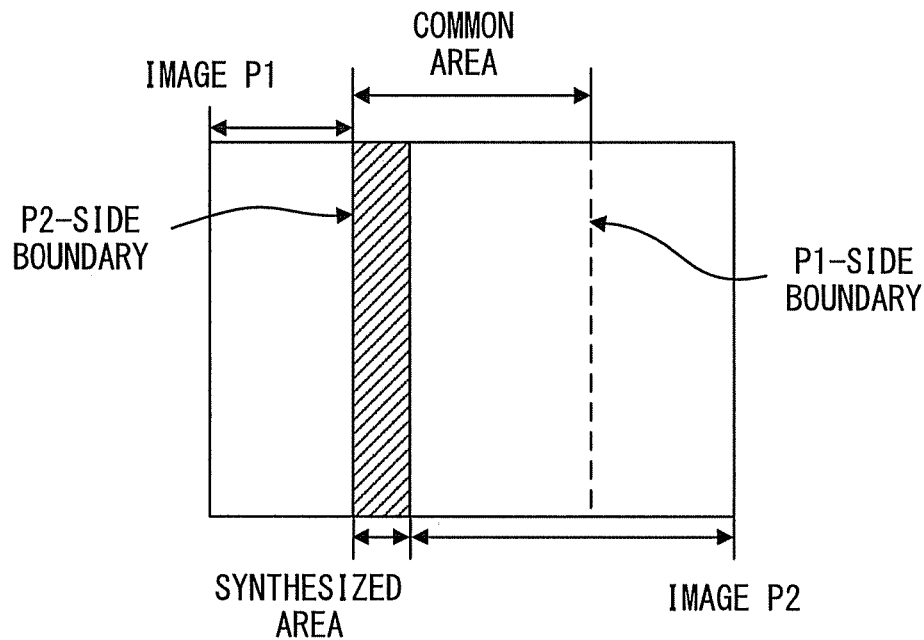
F I G. 9 B

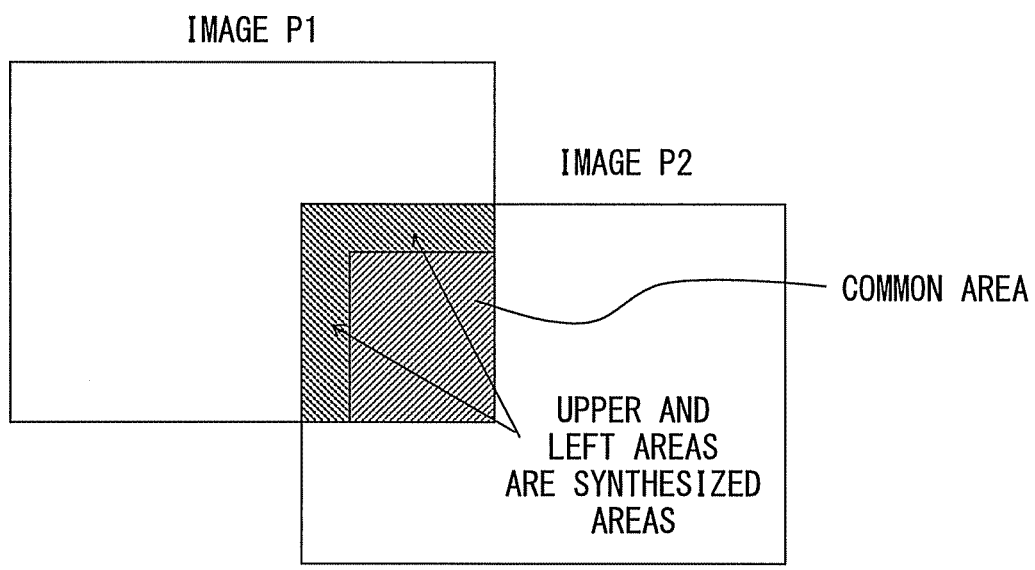
F I G. 10A

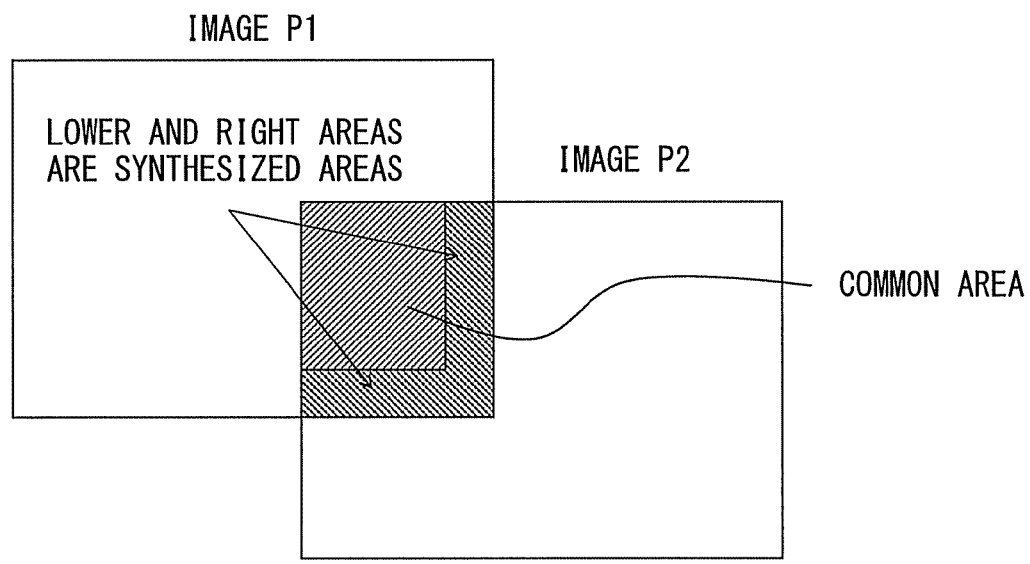
F I G. 1 0 B

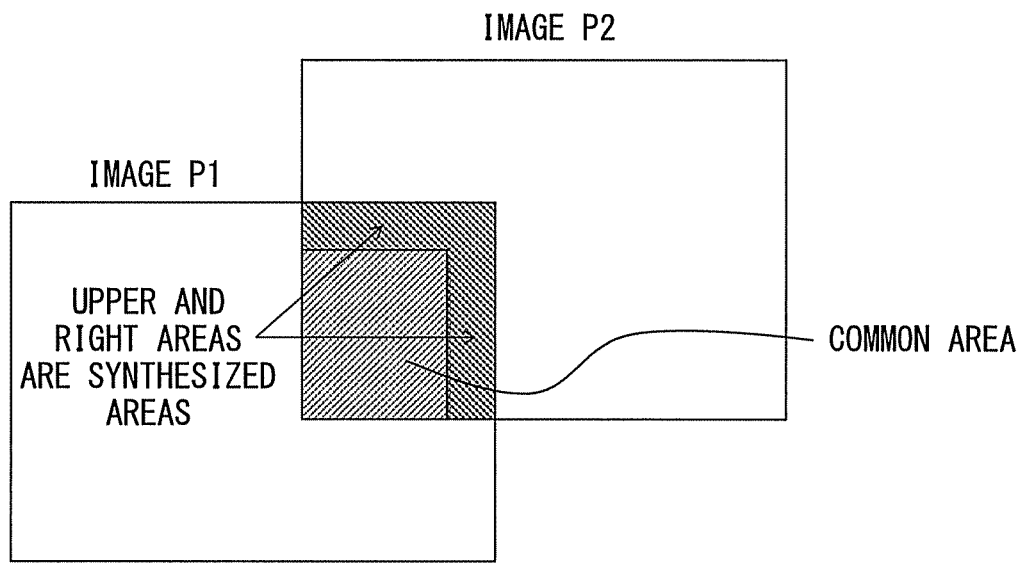
CONDITION 1: MOTION VECTOR IS TO UPPER RIGHT
CONDITION 2: IMAGE P2 IS BOTTOM
F I G. 1 0 C

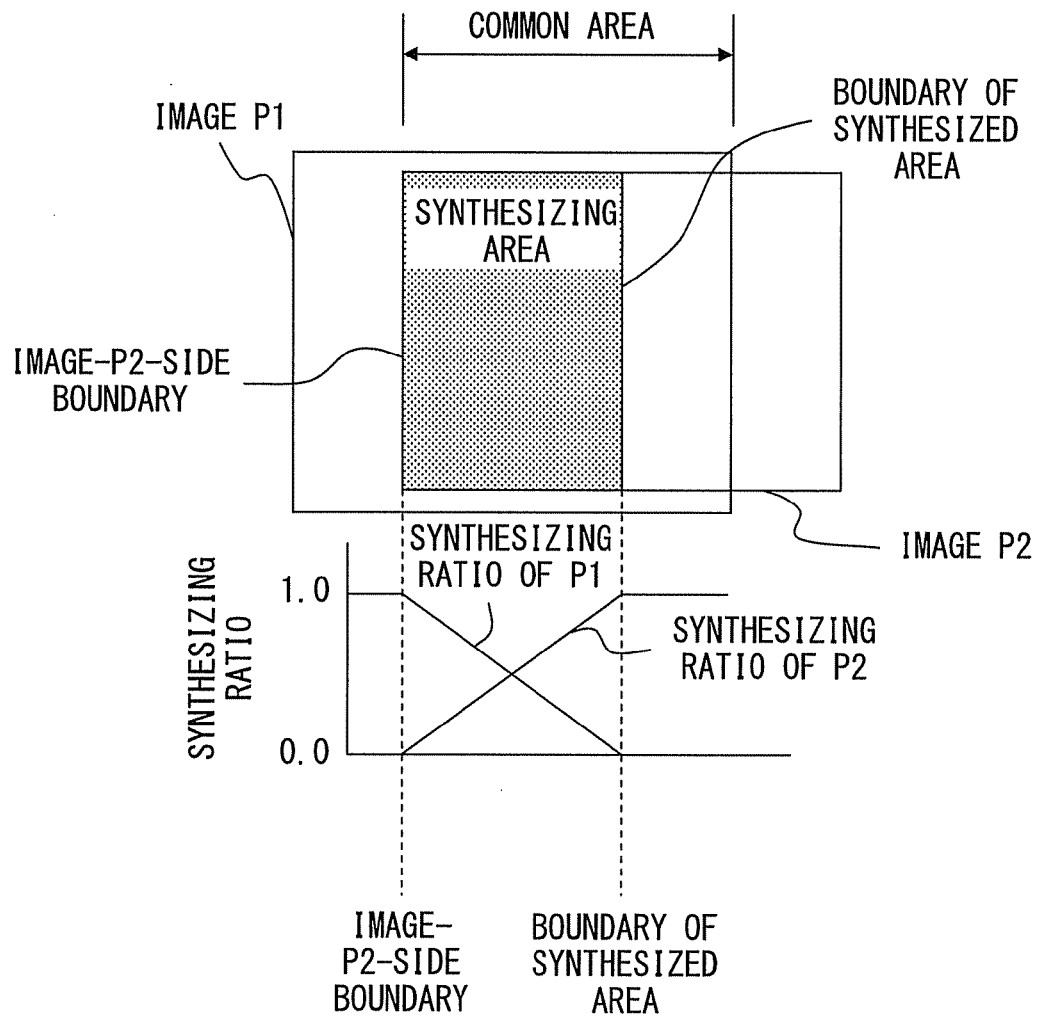
F I G. 1 4

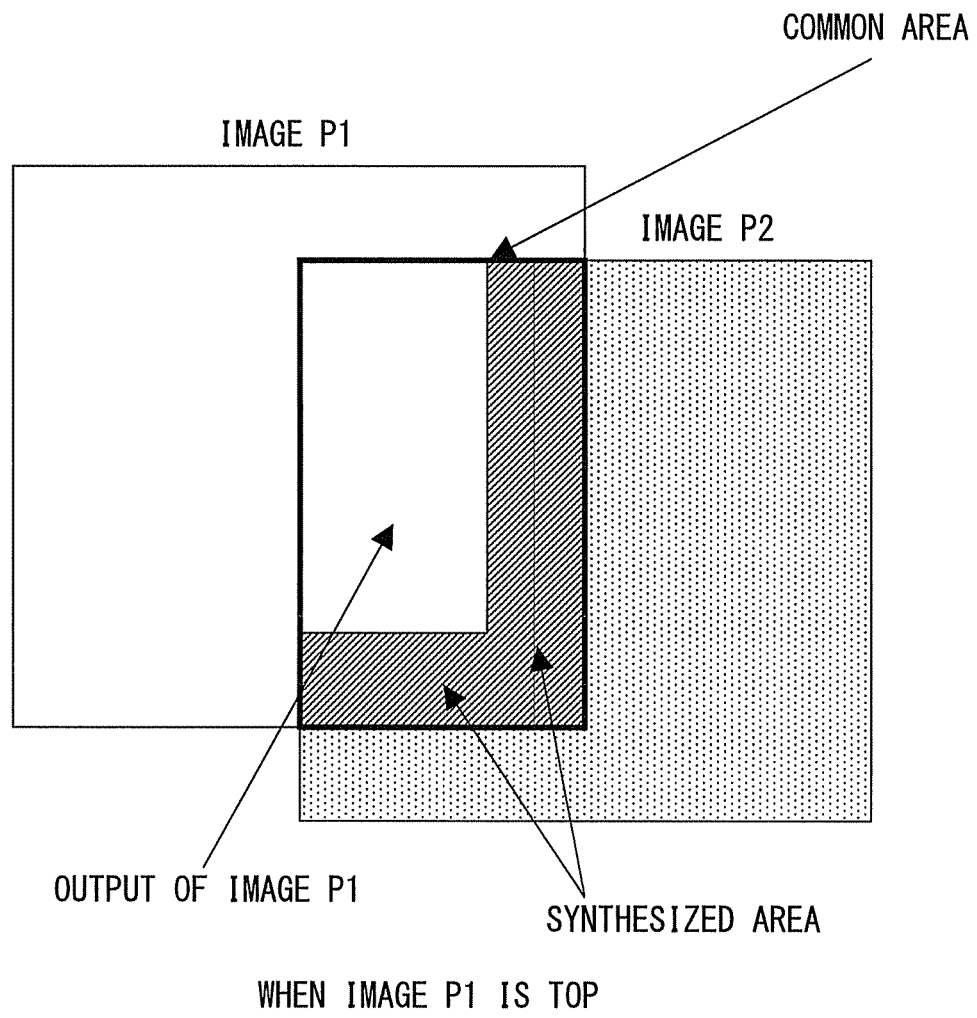
F I G. 15A

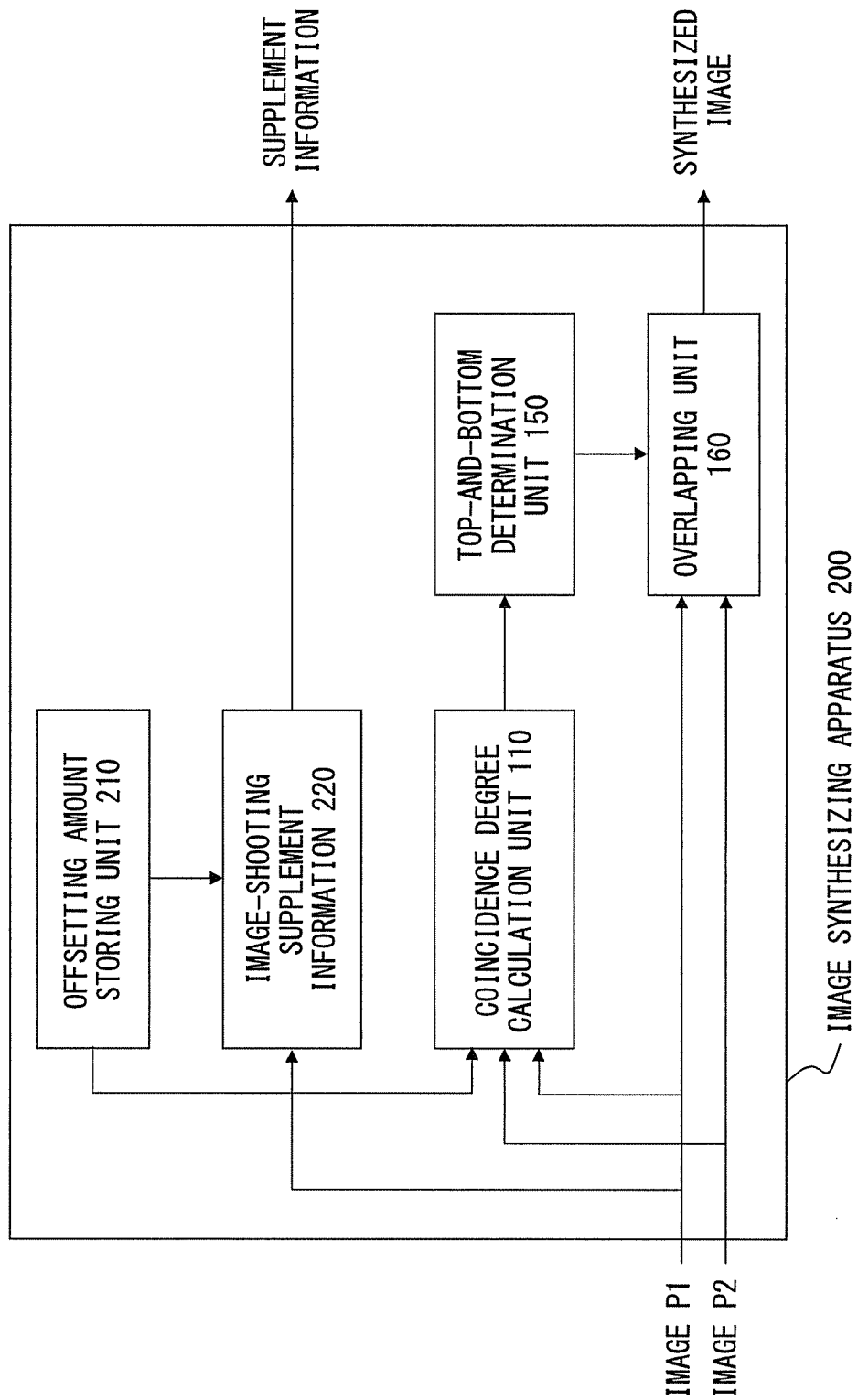
F I G. 16

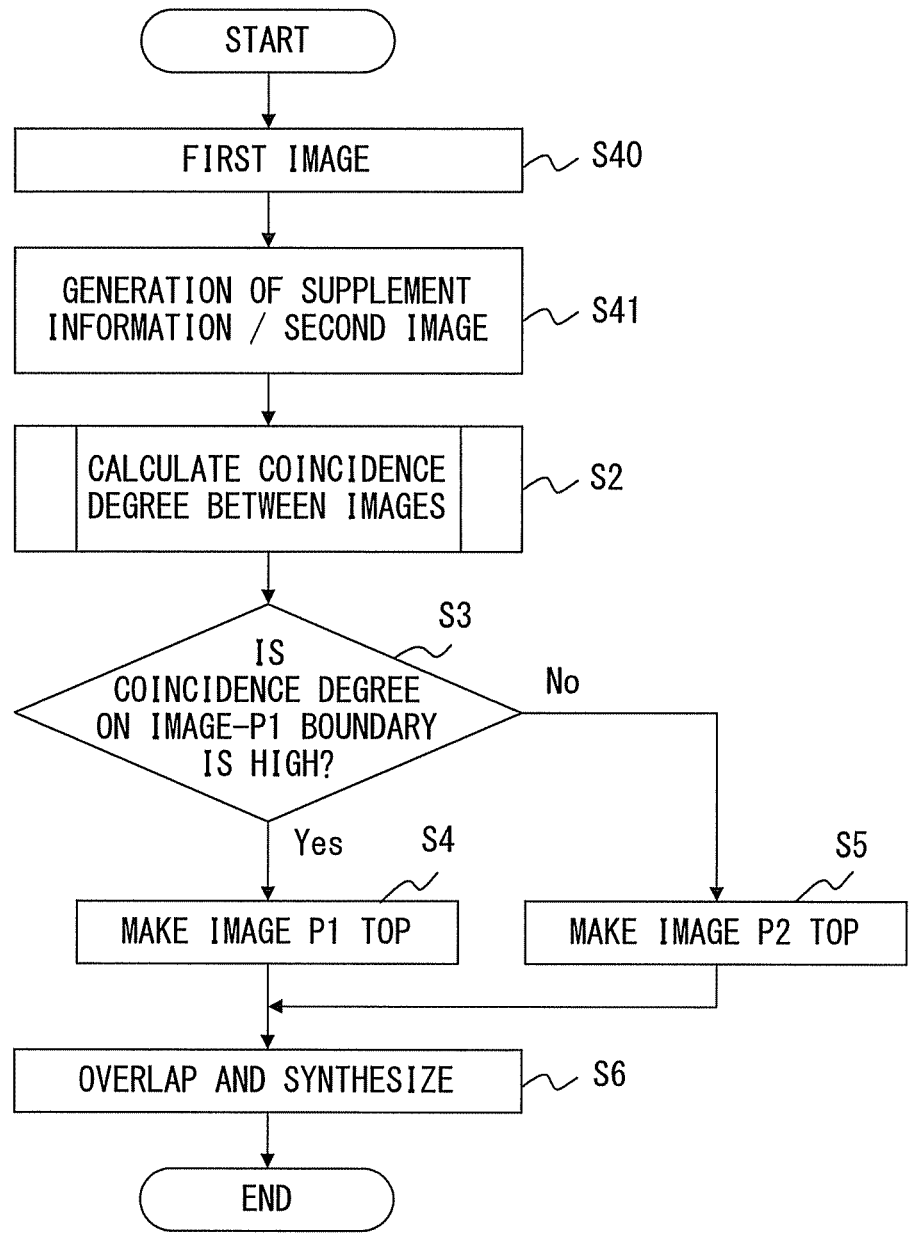
F I G. 1 7

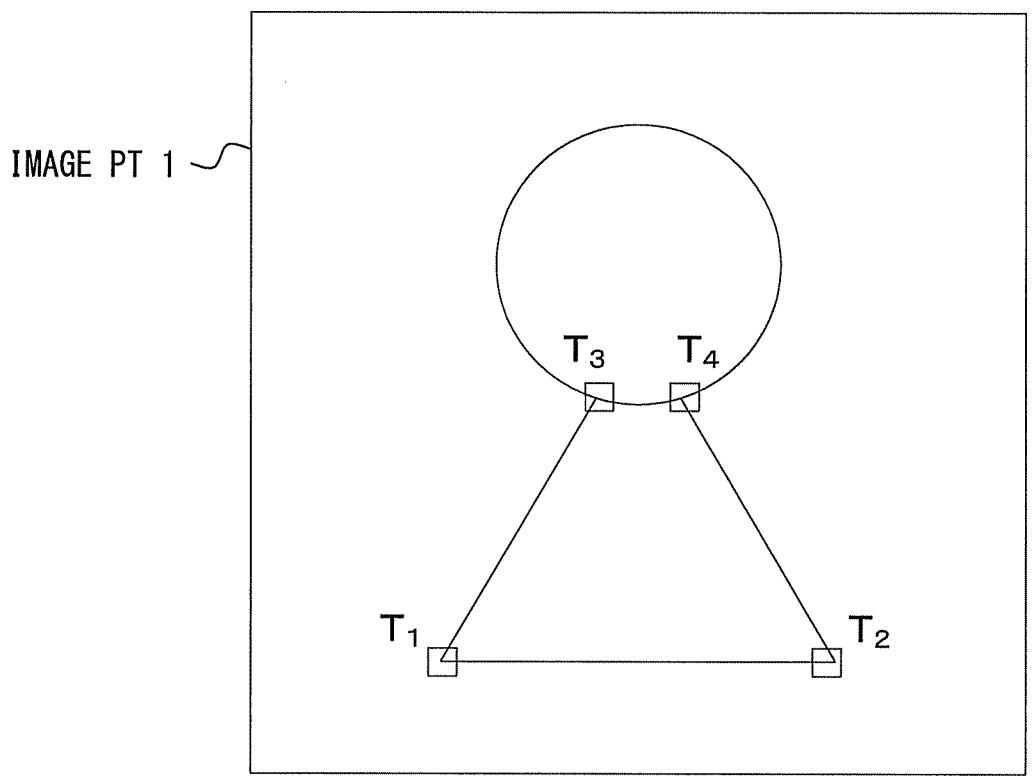
F I G. 2 1 A

IMAGE SYNTHESIZING APPARATUS AND METHOD OF SYNTHESIZING IMAGES

CROSS-REFERENCE TO RELATED APPLICATIONS

This application is a continuation application of International PCT Application No. PCT/JP2007/001038 which was filed on Sep. 25, 2007.

FIELD

The embodiments discussed herein are related to a technique of synthesizing a plurality of still images in the form of data, and particularly to a technique of synthesizing a plurality of still images including a moving object.

BACKGROUND

In a conventional technique, when plural images are to be jointed so as to obtain one image, areas that are overlapping or common to plural images are handled as "margins for pasting" (hereinafter, areas handled as "margins for pasting" are referred to as "common areas") in order to join the images. Thereafter, relative positions between plural images are calculated in order to adjust the positions of the images on the basis of the calculated positions. When the plural images are jointed after the position adjustment, the common areas do not coincide with one another because such plural images involve, even in the common areas, movement of and changes in the object due to the difference in moments at which they were captured. Accordingly, unnatural ruptures can be made on the boundaries between common areas and the images.

In order to cope with this phenomenon, plural images are superposed, usually on a portion of the common areas near the boundaries so that those images are synthesized (referred to as synthesized areas, hereinafter), and thereby the boundaries do not become unnatural. Thus, an image obtained by joining images includes an area consisting of one image and an area consisting of a synthesized image, obtained by superposing plural images.

When plural images are superposed so as to be jointed as described above, a moving object included in the synthesized areas of those images is duplexed, which is problematic.

In order to solve the above problem, Patent Document 1 discloses an image synthesizing apparatus for generating an overlapped image by dividing, into plural areas, images to be overlapped, selecting one or plural images for each of the areas, generating a synthesized image for each area by using the area selected for each area, and repeating this process for all the areas so as to generate a synthesized image.

However, the image synthesizing apparatus in Patent Document 1 needs to divide an image into plural areas, and to perform processes in each of the areas, increasing the number of processes to be performed by the processor, which is a technical problem. Also, it is difficult for the image synthesizing apparatus to select an image for each area appropriately and automatically, which is another technical problem.

Also, the image synthesizing apparatus according to Patent Document 2 separates the objects and backgrounds from two images so as to obtain an image by synthesizing the background parts of the two images, and prompts a user to select one of the two objects separated from the two images so as to further synthesize the selected object and the image obtained by synthesizing the backgrounds.

However, the image synthesizing apparatus according to Patent Document 2 needs to divide the overlapped image into the object and the background, increasing the number of processes to be performed by the processor, which is a technical problem. Also, a user has to select an image for separating the object, which is another technical problem.

Patent Document 1
Japanese Laid-open Patent Publication No. 2000-316125
Patent Document 2
Japanese Laid-open Patent Publication No. 2004-72685

SUMMARY

According to one aspect of the present invention, an image synthesizing apparatus that adjusts positions of areas that have been determined to be common areas in a plurality of images shot at different positions, and synthesizes the images, includes: a common area determination unit determining common areas of the plurality of images; a coincidence degree calculation unit calculating a coincidence degree, which indicates a degree of coincidence between a plurality of images determined by the common area determination unit; an overlapping pattern determination unit determining a pattern of overlapping the plurality of images on the basis of the coincidence degree; and an image synthesizing unit overlapping the plurality of images on the basis of the pattern.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed

BRIEF DESCRIPTION OF DRAWINGS

FIG. 1 shows a principle of an image synthesizing apparatus according to the present invention.

FIG. 6 shows a flowchart of the processes performed by a coincidence degree calculation unit.

FIG. 9A is a (first) diagram illustrating a pattern of two overlapping images that are offset from each other in the direction along one dimension.

FIG. 9B is a (second) diagram illustrating a pattern of overlapping two images that are offset from each other in the direction along one dimension.

FIG. 10A is a (first) diagram illustrating a pattern of overlapping two images that are offset from each other in the directions along two dimensions.

FIG. 10B is a (second) diagram illustrating a pattern of overlapping two images that are offset from each other in the directions along two dimensions.

FIG. 10C is a (third) diagram illustrating a pattern of overlapping two images that are offset from each other in the directions along two dimensions.

FIG. 14 is a diagram illustrating variation in a synthesizing ratio of two images with respect to the distance from the boundary made by the overlapping.

FIG. 15A is a (first) diagram illustrating results of overlapping and synthesizing images P1 and P2 in a synthesizing area.

FIG. 16 shows a configuration of an image synthesizing apparatus according to the second embodiment.

FIG. 17 is a flowchart of the processes performed by an image synthesizing apparatus according to the second embodiment.

FIG. 21A is a (first) diagram illustrating relationships between characteristic points when an image involves rotation.

DESCRIPTION OF EMBODIMENTS

Figure 2:
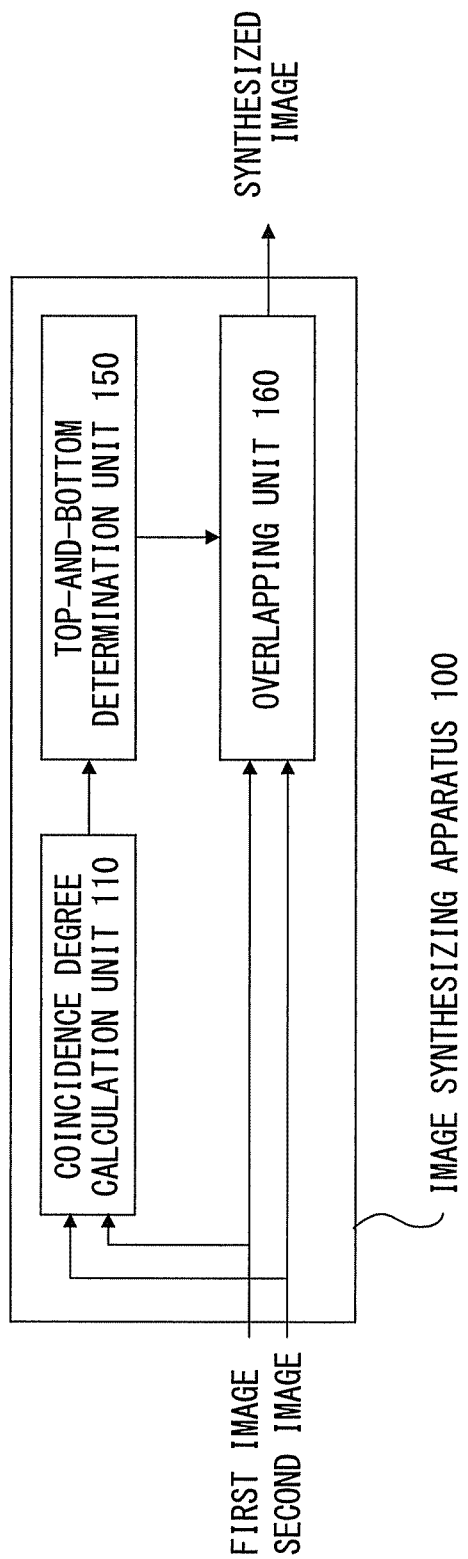
FIG. 2 shows a configuration of an image synthesizing apparatus according to the first embodiment.

Hereinafter, embodiments of the present invention will be explained by referring to the drawings. While the embodiments below are explained in such detail that those skilled in the art can implement them, other embodiments can be used. For example, structural, logical, or electrical alterations to the embodiments below are permitted without departing from the scope of the subjects of the present invention. Thus, the explanations below are not to be understood in a limitative manner, and the scope of the subjects of the present invention should be defined on the basis of the claims of the present invention and of matters that are equivalent legally.

Further, the functions of systems explained herein can be implemented by software, hardware, firmware, or an arbitrary combination thereof. Examples provided herein allow combinations of one or more functions for each unit; however, the examples can be implemented by using other combinations of the functions without departing from the scope of the subjects of the present invention.

FIG. 1 shows a principle of the present invention. As shown in FIG. 1, an image synthesizing apparatus 10 according to the present invention includes a coincidence degree calculation unit 11 for calculating a coincidence degree, which is a degree of coincidence or similarity between plural images, a top-and-bottom determination unit 12 (an overlapping pattern determination unit) for determining a pattern of overlapping plural images, and an overlapping unit 13 for overlapping plural images on the basis of the determined pattern.

First, plural images are input into the coincidence degree calculation unit 11. The coincidence degree calculation unit 11 calculates a coincidence degree, which is a degree of coincidence between the input images in a prescribed area. More specifically, the coincidence degree calculation unit 11 obtains, from the images, pixels at the corresponding positions in areas near the boundary for overlapping plural images (this area is referred to as a coincidence degree calculation area hereinafter, and will be explained later in detail), and calculates a coincidence degree between plural images in a coincidence degree calculation area on the basis of those pixels.

A coincidence degree indicates a degree of coincidence or similarity between plural images in a coincidence degree calculation area, and is calculated on the basis of the statistic relating to the pixels. When a coincidence degree in an area between images is low, the images in that area differ greatly from each other in brightness, the colors, and the like. Examples of statistics relating to the pixels include the number of pixels at the corresponding positions, whether the pixel value difference between them is higher than a prescribed value, the cumulative value of the absolute values of pixel value differences, the difference between the averages of the brightness of images in a prescribed area, and the like.

A coincidence degree calculation area is, more specifically, an area near a boundary made by overlapping plural images. In other words, a prescribed area is an area inward by a prescribed width from the circumference of the common area, in which plural images are overlapped, or an area on the boundary made by overlapping.

On the basis of the above coincidence degree, whether or not the coincidence degree calculation area includes a moving object can be determined. In case of, for example, a background area, involving no movement, pixels at the corresponding positions rarely change in brightness or color from one image to another, and accordingly, the coincidence degree in the area is high. Thus, when the coincidence degree in an area is high, that area can be judged to be a background. In the case of, by contrast, an area including a moving object, the coincidence degree in that area is low because pixels representing the movement of the object change greatly in brightness and color from one image to another, and thus the coincidence degree of that area is low. Thus, when a coincidence degree in an area is low, that area can be judged to include a moving object.

The top-and-bottom determination unit 12 (an overlapping pattern determination unit) determines a pattern of overlapping plural images on the basis of the coincidence degree calculated by the coincidence degree calculation unit 11.

More specifically, the top-and-bottom determination unit 12 determines, as an overlapping pattern, a pattern that makes areas near boundaries with high coincidence degrees appear on the overlapped image (an image obtained by overlapping plural images). In other words, the top-and-bottom determination unit 12 determines, on the basis of the coincidence degree, an overlapping pattern so that one of the plural images is used mainly in the area in which plural images are overlapped.

The overlapping unit 13 overlaps plural images on the basis of the overlapping pattern determined by the top-and-bottom determination unit 12. As a result of this, areas near a boundary with low coincidence degrees is not synthesized on the image obtained by that overlapping.

As described above, when the coincidence degree between images is high near the boundary made by overlapping those images (i.e., the boundary of a common area), it is highly likely that such images do not include a moving object in the area. Thus, when images are overlapped so that an area near the boundary with a high coincidence degree appears on the overlapped image, the problem of duplexing is unlikely to occur because the common area of the overlapped images do not include a moving object. Also in cases where images do not include a moving image near the boundary, unnatural ruptures are unlikely to be made near the boundary if the images are overlapped, so that an area near the boundary with a high coincidence degree will appear on the overlapped images.

When an overlapping pattern is determined, the image that is to be mainly used in the area where plural images are overlapped is also determined at the same time. In other words, it is also said that the top-and-bottom determination unit 12 determines that the image is to be mainly used in the area where plural images are overlapped.

As will be described below, the image synthesizing apparatus 10 according to the present invention calculates the coincidence degree between plural images in areas near the boundary of the common area, and overlaps and synthesizes those images so that a synthesized area near the boundary with a high coincidence degree appears on the image obtained by the overlapping. This makes it possible to prevent an object in those images from being duplexed even when the images include an object. When no object is included in those images, it is possible to prevent an unnatural rupture from being made on the boundary between those images.

Further, the image synthesizing apparatus 10 according to the present invention eliminates processes of dividing an image into plural areas to overlap images for each of such areas and processes requiring a large number of operations such as a process of dividing an image into an object part and a background part. Also, the image synthesizing apparatus 10 requires a smaller number of operations for calculating coincidence degrees, thus imposing fewer burdens on the processor than the conventional techniques.

Further, unlike conventional image synthesizing apparatuses, implementation of the image synthesizing apparatus 10 according to the present invention does not require a large-scale expansion of circuits, making the implementation of the image synthesizing apparatus 10 possible at a relatively low cost.

The image synthesizing apparatus 10 may further include, in addition to the above configuration, a superposing unit for superposing the plural images in areas near the boundary. The image synthesizing apparatus 10 overlaps images by using, on the basis of coincidence degrees, a pattern that makes a boundary that is made by superposing the images unnoticeable. However, an image obtained by superposing images using this manner alone will involve jointing lines between the images, although such lines are unnoticeable. Use of the superposing unit for superposing plural images in areas near a boundary makes such jointing lines further unnoticeable. In addition, to be more specific, an area that is to receive a superposing process is a near-boundary area that appears on an image obtained by superposing plural images.

The image synthesizing apparatus 10 may further include, in addition to the above configuration, an image-shooting supplement unit for generating supplement information on the basis of the offsetting amount (amount of moving vector) in a positional coordinate between an image being shot currently and an image shot previously, and for generating an outputting of the supplement information to an image shooting unit that shoots at least one of plural images.

Thereby, a shooting person can easily shoot images while adopting an offsetting width that has been set.

Also, the image synthesizing apparatus 10 may further include, in addition to the above configuration, an offsetting amount calculation unit for calculating an offsetting amount between plural images, and an image conversion unit for converting, on the basis of the offsetting amount, at least one of the plural images so that the offsetting amount is made smaller in order to overlap the plural images after the conversion.

Thereby, even when plural input images that have not been position adjusted are input, it is possible to conduct position adjustment on such images so as to thereafter overlap them.

The image synthesizing apparatus 10 may also be included in an image shooting device.

Also, an image shooting device having the image synthesizing apparatus 10 may be included in a mobile phone, a PDA (Personal Digital Assistant), a personal computer, or the like.

The embodiments discussed herein are also related to methods based on steps of processes executed by the respective units that constitute the image synthesizing apparatus 10, and the above purposes can be attained by using those methods as well.

The embodiments discussed herein are also related to a program, a recording medium recording that program, and a program product, said program being configured to make a processor perform control equivalent to the functions implemented by the respective units that constitute the image synthesizing apparatus 10. The above purposes can also be achieved by making a processor read that program and control various interfaces or the like connected to the processor in accordance with the program.

Hereinafter, explanations will be given based on an assumption that two images overlap. However, that assumption is only for simplicity of explanation, and accordingly the number of images may be more than two. Also, the explanations are based on an assumption that images are quadrangular; however, the images can be shapes other than quadrangular.

First, an image synthesizing apparatus according to the first embodiment will be explained. An image synthesizing apparatus 100 according to the first embodiment overlaps and synthesizes image P1 and image P2 that have already been position adjusted.

FIG. 2 shows a configuration of the image synthesizing apparatus 100 according to the first embodiment. As shown in FIG. 2, the image synthesizing apparatus 100 includes a coincidence degree calculation unit 110, a top-and-bottom determination unit 150, and an overlapping unit 160.

Images P1 and P2, having already been position adjusted, are input to the coincidence degree calculation unit 110. The coincidence degree calculation unit 110 obtains, from images P1 and P2, pixels that are at corresponding positions in both images in the coincidence degree calculation areas, and calculates the coincidence degrees of the coincidence degree calculation areas. Coincidence degree calculation areas usually exist in plural, and accordingly the coincidence degree calculation unit 110 calculates the coincidence degree for each of the coincidence degree calculation areas.

The top-and-bottom determination unit 150 determines how to overlap images P1 and P2 on the basis of the coincidence degree calculated by the coincidence degree calculation unit. More specifically, the top-and-bottom determination unit 150 determines which of the images P1 and P2 should appear in the overlapped images. The overlapping unit 160 overlaps images P1 and P2 in accordance with the determination made by the top-and-bottom determination unit 150, and synthesizes the images. The image obtained by the synthesizing is output.

Figure 3:
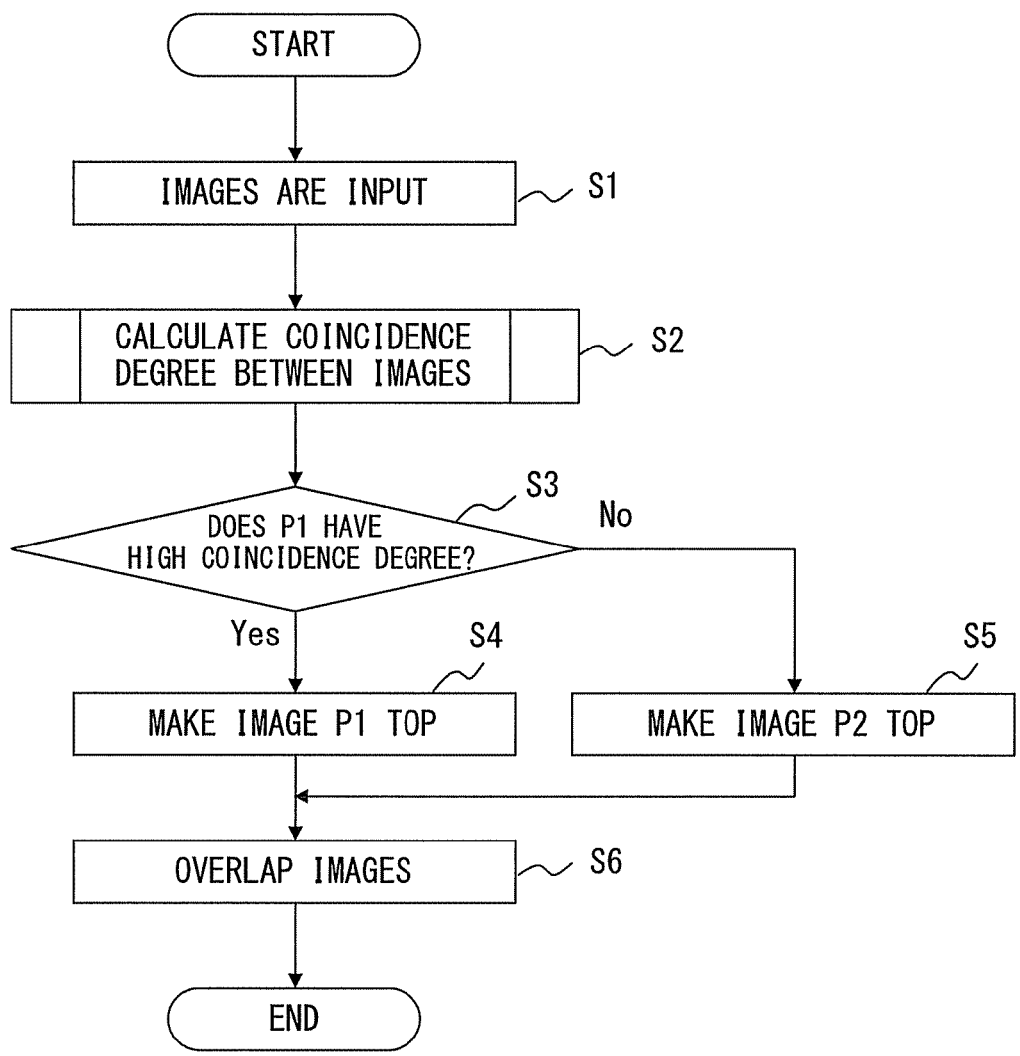
FIG. 3 is a flowchart of the processes performed by an image synthesizing apparatus according to the first embodiment.

Hereinafter, a flow of the processes performed by the image synthesizing apparatus 100 will be explained by referring to FIG. 3.

First, when images P1 and P2 are input to the image synthesizing apparatus 100 (step S1), the coincidence degree calculation unit 110 calculates the coincidence degree for each of a plurality of coincidence degree calculation areas (step S2). Next, the top-and-bottom determination unit 150 determines which of the areas have high coincidence degrees among the plurality of coincidence degree calculation areas (step S3), and determines a pattern of overlapping images P1 and P2 on the basis of the determination result (steps S4 and S5). The overlapping unit 160 overlaps images P1 and P2 on the basis of the determination made by the top-and-bottom determination unit 150, and synthesizes the images (step S6).

Next, coincidence degree calculation areas, for which the coincidence degree calculation unit 110 calculates the coincidence degrees, will be explained. First, explanations will be given for a case where images P1 and P2 are offset in a direction along one dimension, i.e., the vertical or horizontal direction.

When images P1 and P2 are offset in a direction along one dimension, the common area is a quadrangle. This quadrangle is made up of a side formed by a portion of the circumference of image P1 (referred to as the image-P1-side boundary), a side formed by a portion of the circumference of image P2 (referred to as the image-P2-side boundary), and two sides formed by portions of the circumferences of images P1 and P2, respectively. In this case, there are two coincidence degree calculation areas. One is an area inward by a prescribed number of pixels (or by a particular width) from the image-P1-side boundary. The other is an area inward by a prescribed number of pixels (or by a particular width) from the image-P2-side boundary.

Figure 4:
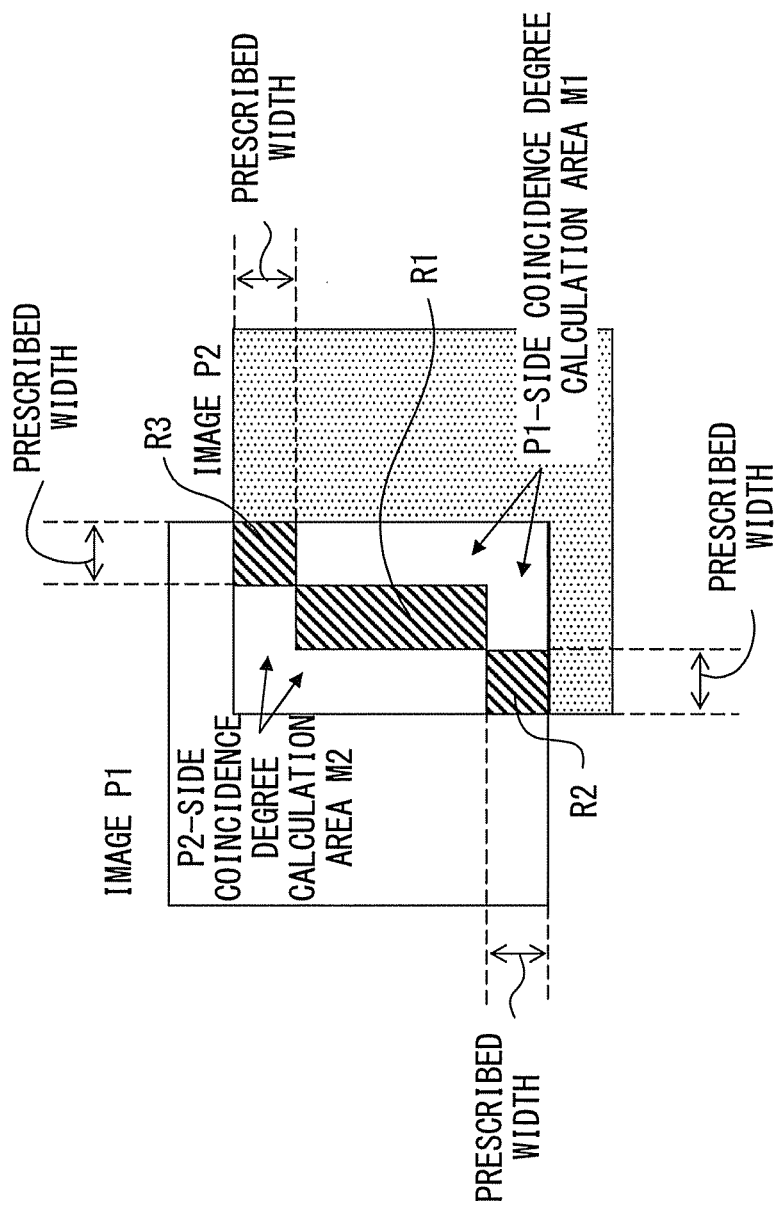
FIG. 4 is a diagram illustrating coincidence degree calculation areas in the case where two images are offset in two-dimensional directions.

Explanations will be given, by referring to FIG. 4, to coincidence degree calculation areas in the case where images P1 and P2 are offset in two-dimensional directions. FIG. 4 shows a common area and coincidence degree calculation areas made when image P2 is offset from image P1 in the down right direction. The area in which images P1 and P2 are overlapped is the common area. The two sides of the circumference of the common area, that is, two of the four sides forming the boundary, are parts of the two adjacent sides of the quadrangle forming the circumference of image P1. The other two sides of the boundary of the common area are parts of the two adjacent sides of the quadrangle forming the circumference of image P2. Hereinafter, the former group is referred to as the image-P1-side boundary, and the latter group is referred to as the image-P2-side boundary.

There are two coincidence degree calculation areas. One is P1-side coincidence degree calculation area M1, which is an area inward by a prescribed number of pixels (or by a prescribed width) from the image-P1-side boundary. The other is P2-side coincidence degree calculation area M2, which is an area inward by a prescribed number of pixels (or by a prescribed width) from the image-P2-side boundary.

As shown in FIG. 4, P1-side coincidence degree calculation area M1 and P2-side coincidence degree calculation area M2 are in the common area, and are L-shaped areas located around the two opposing corners among the four corners of the common area. It is not necessary to calculate the coincidence degrees of the shaded areas in the common area. This is because shaded area R1, located around the center of the common area, is apart from the boundary made by overlapping the images, and the coincidence degrees of shaded areas R2 and R3 are the same as those of P1-side coincidence degree calculation area M1 and P2-side coincidence degree calculation area M2, and are useless for determining the top and the bottom of the images.

The coincidence degree calculation unit 110 will be explained in more detail below. The coincidence degree calculation unit 110 can calculate coincidence degrees using several different methods. For example, the coincidence degree calculation unit 110 may calculate a coincidence degree on the basis of the difference in pixel value between two pixels at corresponding positions, the statistic of brightness of images P1 and P2, and/or the continuity between images along the boundary. It is also possible to calculate a coincidence degree for an image reduced in size to, for example, ½ vertically and horizontally by using sub-sampling.

Figure 5:
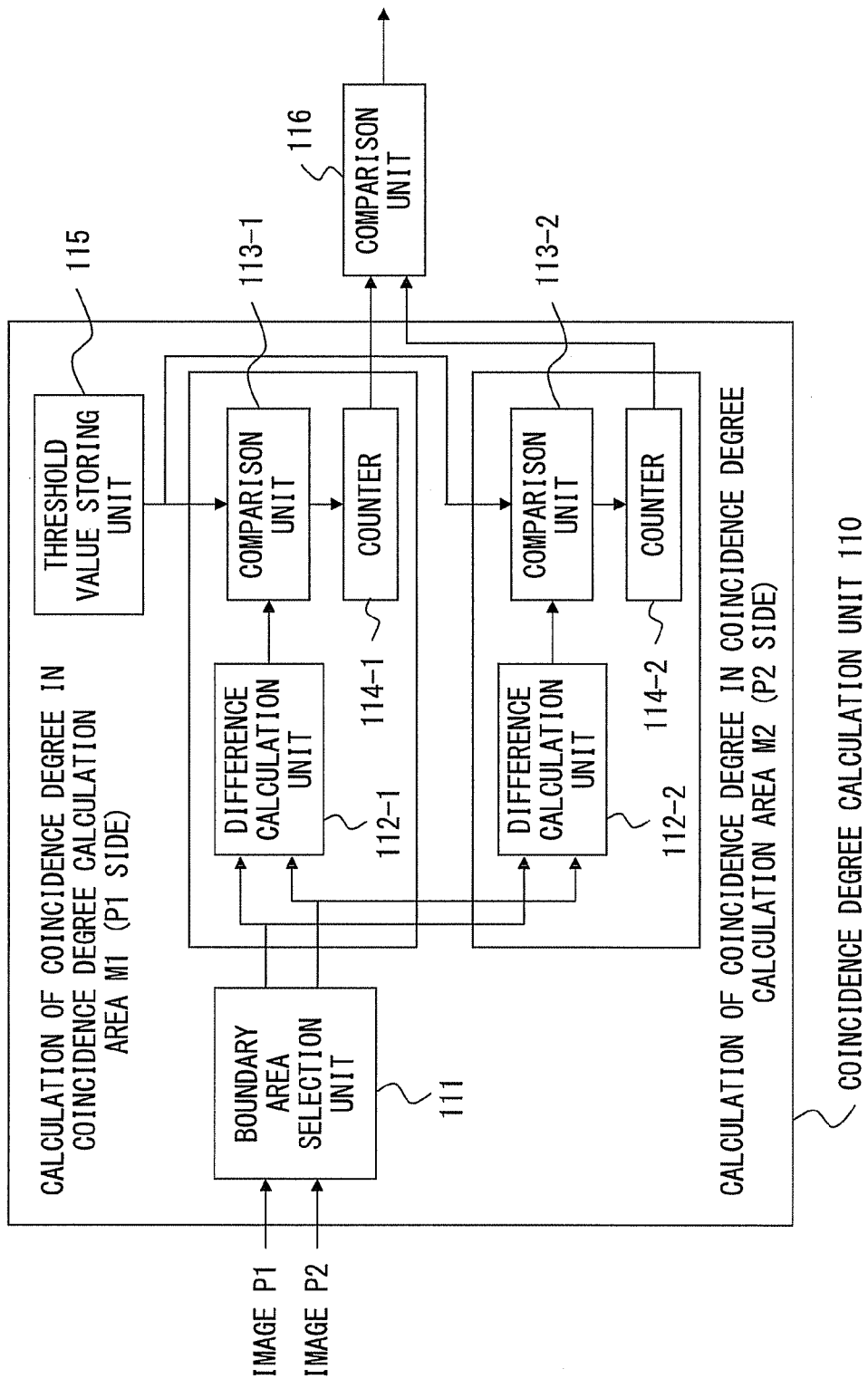
FIG. 5 is a (first) diagram showing an exemplary configuration of a coincidence degree calculation unit.

First, explanations will be given for a case where a coincidence degree is calculated on the basis of a pixel value difference, as an example. FIG. 5 shows an exemplary configuration of the coincidence degree calculation unit 110 that calculates a coincidence degree on the basis of a pixel value difference. As shown in FIG. 5, the coincidence degree calculation unit 110 includes a boundary area selection unit 111, difference calculation units 112-1 and 112-2, comparison units 113-1 and 113-2, counters 114-1 and 114-2, and a threshold value storing unit 115.

The difference calculation unit 112-1, the comparison unit 113-1, and the counter 114-1 calculate the coincidence degree of P1-side coincidence degree calculation area M1, and the difference calculation unit 112-2, the comparison unit 113-2, and the counter 114-2 calculate the coincidence degree of P2-side coincidence degree calculation area M2. The former group is referred to as the image-P1-side calculation unit, and the latter group is referred to as the image-P2-side calculation unit. They are basically equal to each other in configuration.

Hereinafter, a flow of the process performed by the coincidence degree calculation unit 110 will be explained roughly. That process corresponds to step S2 in FIG. 3.

Images P2 and P2 are input to the boundary area selection unit 111. On the basis of the coordinate information indicating the positions of the pixels in image P1 or P2, the boundary area selection unit 111 determines which of coincidence degree calculation areas M1 and M2 the input pixels are in, or whether such pixels are in an area other than coincidence degree calculation areas M1 and M2. When a pixel is in P1-side coincidence degree calculation area M1, the boundary area selection unit 111 outputs that pixel to the P1-side calculation unit. When a pixel is in P2-side coincidence degree calculation area M2, the boundary area selection unit 111 outputs that pixel to the P2-side calculation unit. When a pixel is not in either P1-side coincidence degree calculation area M1 or M2, that pixel is not output, and the process proceeds to steps for pixels other than such pixels. The boundary area selection unit 111 performs this process for all input pixels.

Hereinafter, explanations will be focused on the P1 side. However, basically the same process is performed on the P2 side. First, when pixels are input, the difference calculation unit 112-1 (a difference calculation unit 112-2 on the P2 side) calculates the difference between two pixels at the corresponding positions between images P1 and P2, and outputs the absolute value of the calculated difference to the comparison unit 113-1 (the comparison unit 113-2 on the M2 side). The comparison unit 113-1 (the comparison unit 113-2 on the P2 side) compares the absolute value of the difference with a threshold value stored in the threshold value storing unit 115.

When the absolute value is greater than the threshold value, the counter 114-1 (the counter 114-2 on the P2 side) increments the counter value by one. When the countering of pixels input to the P1 and P2 sides is terminated, the counters 114-1 and 114-2 output the coincidence degrees based on the counting results to a comparison unit 116. In doing this, each coincidence degree is the inverse of (counter value+1).

The comparison unit 116 as part of the top-and-bottom determination unit 150 compares the coincidence degree calculated for the P1 side and that calculated for the P2 side so as to determine which is the greater, and outputs the determination result to the overlapping unit 160.

Hereinafter, a flow of a process for calculating coincidence degrees will be explained by referring to FIG. 6. Hereinafter, the P1 side will be explained by referring to FIG. 6.

First, the difference calculation unit 112-1 waits for pixels to be input (step S10). When pixels are input (Yes in step S10), the difference calculation unit 112-1 calculates the difference in pixel values between pixels at the corresponding positions respectively in images P1 and P2 (step S11). Next, the comparison unit 113-1 obtains a threshold value from the threshold value storing unit 115 (step S12), and determines whether or not the difference is greater than the threshold value (step S13). When the difference has been determined to be greater (Yes in step S13), the counter 114-1 increments the counter value by one (step S14), and the process returns to step S10. When pixels have not been input after a prescribe time period has elapsed (no in step S10), the counter 114-1 terminates the counting. Thereafter, the counter 114-1 outputs, to the comparison unit 116, the inverse of (counter value+1), i.e., the inverse of the value obtained by adding 1 to the counter value as the coincidence degree (step S15), and terminates the process. Steps S20 through S25, which are steps for the P2 side, are basically the same as steps S10 through S15 for the P1 side, and accordingly the explanations thereof will be omitted. Thereafter, the comparison unit 116 compares the coincidence degree of the P1 side and the coincidence degree of the P2 side.

The above configuration is provided with respective process blocks for the P1 side and the P2 side. However, a configuration is also possible in which two counters, i.e., the counters 114-1 and 114-2, are prepared for the P1 and P2 sides, respectively, and the other units are shared by them.

Explanations have been given for a case where the number of pixels having a pixel value difference greater than a threshold value is counted. However, it is possible to calculate the cumulative value of the differences (absolute values) of pixel values of the pixels at the corresponding positions between images P1 and P2 so as to handle the inverse of the cumulative value as a coincidence degree. In that case too, the fewer pixels there are having great pixel value differences, the higher the coincidence degree.

Next, explanations will be given for a case where a coincidence degree is calculated on the basis of the statistic of the brightness of images. Here, a YCbCr color space or a YPbPr color space, which are often used in the field of television, etc, is used for the explanation. In these color spaces, brightness is represented in units of Y values. This is just an example, and various different color spaces can be selected depending upon the device, and the same method can basically be applied to any of such color spaces.

Figure 7:
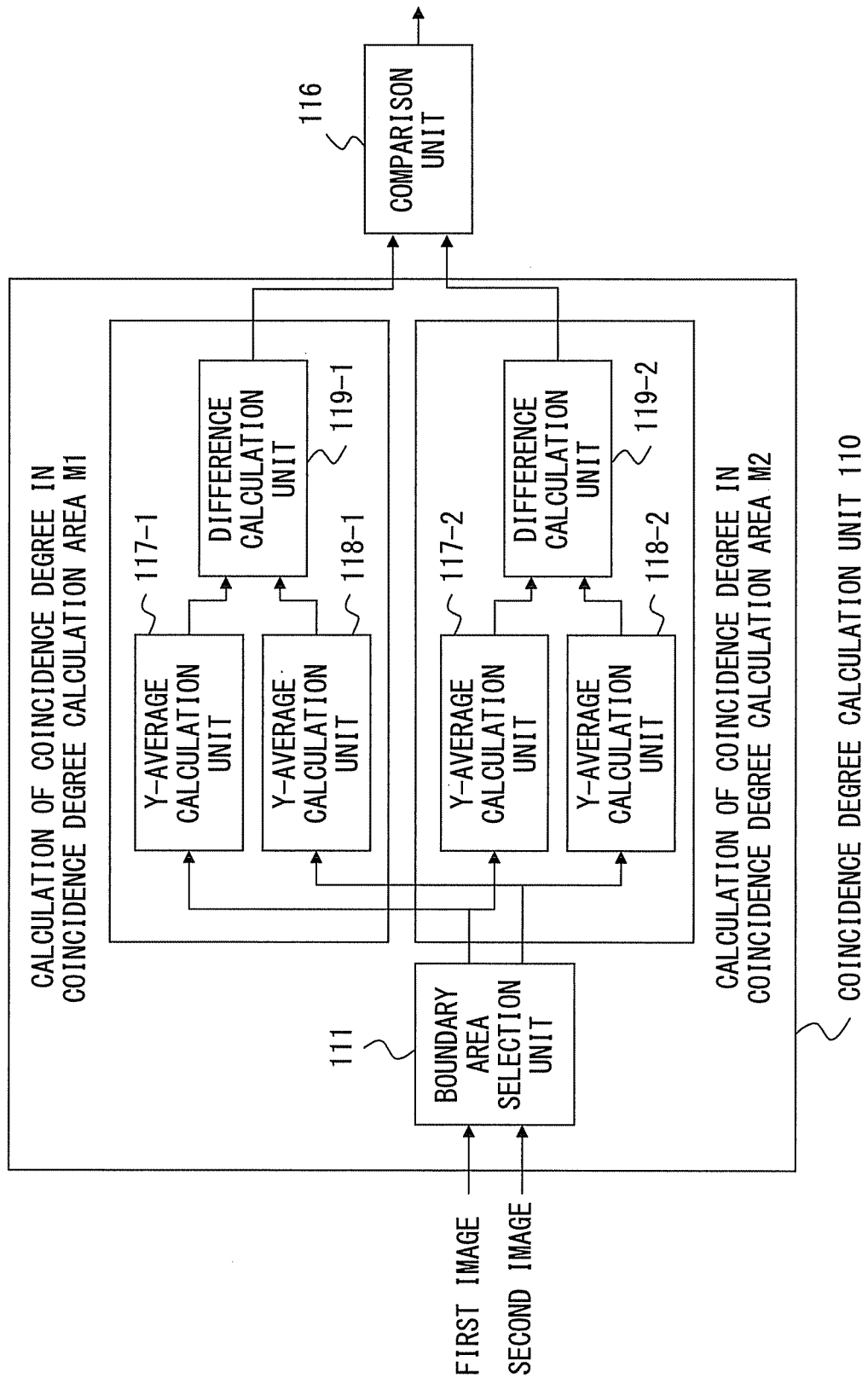
FIG. 7 is a (second) diagram showing an exemplary configuration of a coincidence degree calculation unit.

FIG. 7 shows an exemplary configuration of the coincidence degree calculation unit 110 that calculates a coincidence degree on the basis of the statistic of the brightness of images. As shown in FIG. 7, the coincidence degree calculation unit 110 includes the boundary area selection unit 111, Y-average calculation units 117-1, 117-2, 118-1, and 118-2, and difference calculation units 119-1 and 119-2.

The Y-average calculation units 117-1 and 118-1 and the difference calculation unit 119-1 constitute the P1 side, and the Y-average calculation units 117-2 and 118-2 and the difference calculation unit 119-2 constitute the P2 side. They are basically equal to their respective counterparts in configuration.

When images P1 and P2 are input, the boundary area selection unit 111 outputs pixels in P1-side coincidence degree calculation area M1 to the P1 side on the basis of the coordinate information of the pixels, and outputs pixels in P2-side coincidence degree calculation area M2 to the P2 side. Hereinafter, the respective units on the P1 side will be explained; however, basically the same explanations can be applied to the P2 side.

Among pixels output from the boundary area selection unit 111, pixels of image P1 are input to the Y-average calculation unit 117-1, and pixels of image P2 are input to the Y-average calculation unit 118-1. The Y-average calculation unit 117-1 calculates the average value of the Y values of pixels of image P1 so as to output the calculation result to the difference calculation unit 119-1. The Y-average calculation unit 118-1 calculates the average value of the Y values of pixels of image P2 so as to output the calculation result to the difference calculation unit 119-1. The difference calculation unit 119-1 calculates the difference of Y-value averages between images P1 and P2, and outputs the absolute value of the calculated difference to the comparison unit 116 as a coincidence degree. A case in which the average value of Y values is used has been explained; however, the dispersion or the deviation of Y values may be used instead of average values.

Figure 8:
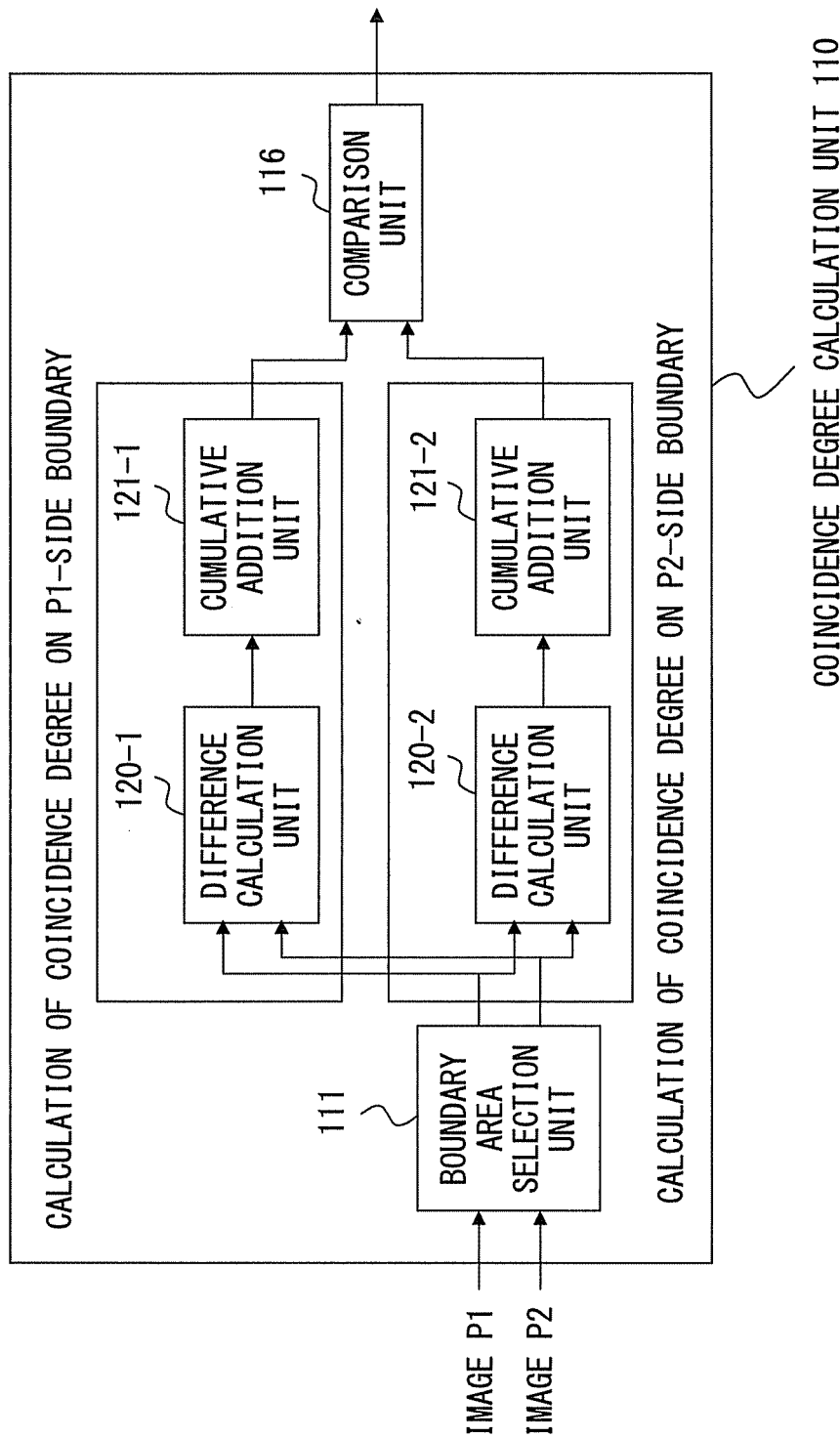
FIG. 8 is a (third) diagram showing an exemplary configuration of a coincidence degree calculation unit.

Next, explanations will be given for a case where a coincidence degree is calculated on the basis of the continuity of a boundary. FIG. 8 shows an exemplary configuration of the coincidence degree calculation unit 110 that calculates a coincidence degree on the basis of the continuity of a boundary. As shown in FIG. 8, the coincidence degree calculation unit 110 includes the boundary area selection unit 111, difference calculation units 120-1 and 120-2, and cumulative addition units 121-1 and 121-2. The difference calculation unit 120-1 and the cumulative addition unit 121-2 calculate a coincidence degree of the image P1 side, and the difference calculation unit 120-2 and the cumulative addition unit 121-1 calculate a coincidence degree of the image P2 side. The P1 and P2 sides are configured of basically the same components.

When a coincidence degree is calculated on the basis of the continuity of a boundary, the coincidence degree calculation unit 110 calculates the coincidence degrees of pixels on the boundary, instead of calculating those of pixels in a coincidence degree calculation area. In such a case, on the basis of the coordinate information in input images P1 and P2, the boundary area selection unit 111 outputs, to the P1 side, pixels having been determined to be on the image-P1-side boundary, and outputs, to the P2 side, pixels having been determined to be on the image-P2-side boundary.

Hereinafter, explanations will be given for the respective units of the P1 side. Basically the same explanations can also be applied to the P2 side.

The coincidence degree of the P1 side is calculated by cumulatively adding the absolute values of the difference between two pixels on the boundary on the P1 side. In other words, the difference calculation unit 120-1 calculates the difference in pixel value between two pixels at the corresponding positions in images P1 and P2. The cumulative addition unit 121-1 cumulatively adds the absolute values of the differences calculated by the difference calculation unit 120-1, and outputs the result of the cumulative addition as the P1-side coincidence degree to the comparison unit 116 when it has performed the process on all pixels on the P1-side boundary.

When the coincidence degrees of the coincidence degree calculation areas on the P1 and P2 sides (or the P1-side boundary and the P2-side boundary) have been calculated as described above, the top-and-bottom determination unit 150 determines how to overlap images P1 and P2 on the basis of whether the P1-side-near-boundary area or the P2-side-near-boundary area should appear on the image obtained by the overlapping. More specifically, the top-and-bottom determination unit 150 compares the coincidence degrees of the P1 side and the P2 side calculated by the coincidence degree calculation unit 110. When the top-and-bottom determination unit 150 has determined that the coincidence degree of the image-P1 side is higher, it determines that image P1 should be overlapped on image P2, and when it has determined that the coincidence degree of the image P2 side is higher, it determines that image P2 should be overlapped on image P1. It is also possible to set beforehand a default or to prompt users to determine whether the image-P1 side or the image-P2 side is to be the top when the coincidence degrees of the image-P1 side and the image-P2 side are equal.

Hereinafter, explanations will be given for a pattern of overlapping images P1 and P2. First, explanations will be given for a pattern of overlapping two images P1 and P2 that are offset in the direction along one dimension, i.e., offset in the right and left directions or offset in the up and down directions. In FIGS. 9A and 9B, images P1 and P2 are offset from each other in the right and left directions (one dimension). When those images P1 and P2 are to be overlapped, two patterns can be used, a pattern of making image P1 the top and a pattern of making image P2 the top.

Regardless of which pattern is used, one of the images P1 and P2 is used as it is before overlapping for areas other than the common area. For example, for the area that was image P1 before the overlapping, image P1 is used, and for the area that was image P2 before the overlapping, image P2 is used.

For the common area, a different image is used depending upon whether the selected pattern makes image P1 the top or makes image P2 the top. As shown in FIG. 9A, when image P1 is overlapped on image P2, the P1-side boundary appears on the overlapped image (the image obtained by overlapping those images), and the P2-side boundary is hidden by the image P1. In the common area, image P2 is used. Similarly, as shown in FIG. 9B, when image P2 is overlapped on image P1, the image-P2-side boundary appears on the overlapped image, and the image-P1-side boundary is hidden by image P2. In the common area, image P2 is used.

Next, a pattern is shown of overlapping images P1 and P2 when they are offset both in the right and left directions and the up and down directions. In such a case, there are four overlapping patterns. FIG. 10 show three of such patterns. FIGS. 10A through 10C show the patterns of overlapping images that are offset both in the right and left directions and the up and down directions for viewers.

FIGS. 10A and 10B respectively show two overlapping patterns for a case where image P2 is offset from image P1 in the right down direction from the vantage of the viewer. As shown in FIG. 10A, when image P2 is overlapped on image P1, the image-P2-side boundary appears on the overlapped image, and the image-P1-side boundary is hidden in the overlapped image. Image P2 is used for the common area. When, by contrast, image P1 is overlapped on image P2 as shown in FIG. 2B, the image-P1-side boundary appears on the overlapped image, and the image-P2-side boundary is hidden in the overlapped image. Image P1 is used for the common area.

There are two patterns also for a case where image P2 is offset from image P1 in the right up direction from the vantage of the viewer. As shown in FIG. 10C, when image P1 is overlapped on image P2, the image-P1-side boundary appears on the overlapped image, and image P1 is used for the common area. Illustration of a case where image P2 is on image P1 is omitted.

For the areas other than the common area, similarly to cases where two images are offset in the direction along one dimension, image P1 is used for an area that was image P1 before the overlapping, and image P2 is used for an area that was image P2 before the overlapping.

When the top-and-bottom determination unit 150 has determined which of images P1 and P2 are to be the top as described above, the overlapping unit 160 overlaps images P1 and P2, selecting one of them as the top in accordance with that determination.

As described above, the image synthesizing apparatus 100 overlaps plural images so that the area near the boundary having a high coincidence degree is the top. As a result of this, the area near the boundary that became the top after the overlapping appears on the overlapped image, and the area near the boundary that became the bottom after the overlapping is hidden in the overlapped image.

As was already described, when an area near the boundary (coincidence degree calculation area) made by overlapping plural images has a high coincidence degree, it is highly likely to include a moving object. Accordingly, when images are overlapped so that an image having, as its circumference, a boundary of a highly incident common area at its top, that common area is unlikely to include a moving area, reducing the risk of the problem of duplexing.

Also, when a coincidence degree is high, the areas near the boundary are close to each other between plural images, and accordingly overlapping images so that an image having, as its circumference, a near-boundary area with a high coincidence degree at its top makes it less likely to make an unnatural rupture on the boundary on the overlapped image even when there is a moving object in areas near the boundary.

Figure 11:
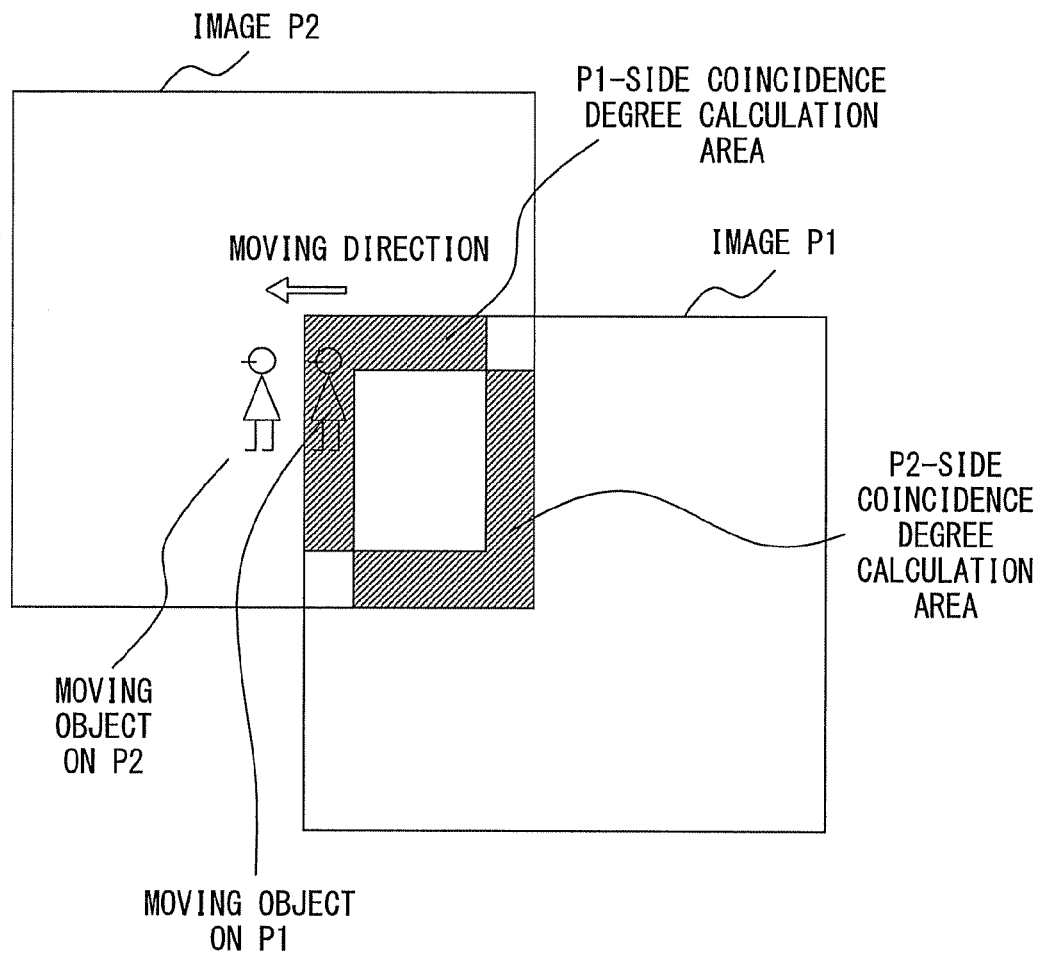
FIG. 11 is a (first) diagram illustrating the overlapping of two images that include a moving object.

Hereinafter, explanations will be given for a case where two images including a moving object are overlapped, by referring to FIGS. 11 and 12. As shown in FIG. 11, images P1 and P2 include a walking person as an object. It is supposed that the person is moving from right to left from the vantage of viewers and image P1 was shot prior to image P2.

Image P1 includes the person in the near-image-P1-side boundary area (this area also serves as a coincidence degree calculation area). Image P2 does not include the person in either the near-image-P1-side boundary area or near-image-P20-side boundary area. In such a case, the coincidence degree of the coincidence degree calculation area on the image-P2 side calculated by the coincidence degree calculation unit 110 is higher than that of the image-P1 side. Accordingly, the top-and-bottom determination unit 150 determines to overlap image P2 onto image P1, and the overlapping unit 160 generates an image made of image P1 on image P2.

Figure 12:
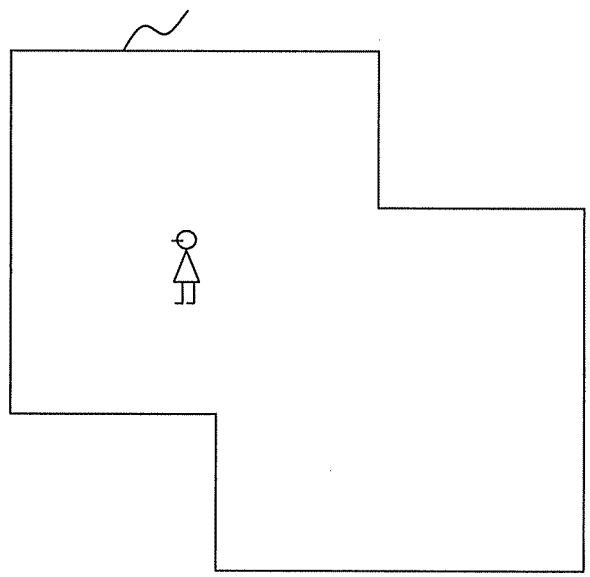
FIG. 12 is a (second) diagram illustrating the overlapping of two images that include a moving object.

FIG. 12 shows an image that the overlapping unit 160 has generated by overlapping images P1 and P2 shown in FIG. 11. As shown in FIG. 12, as a result of overlapping image P2 onto image P1, the person included in the area near the image-P1-side boundary is hidden by image P2. By contrast, an area near the image-P2-side boundary, not including the person, is overlapped onto image P1, and this area does not include a moving object. The person included in an area other than the common area in image P2 appears on the overlapped image.

As described above, the image synthesizing apparatus 100 can avoid the duplexing of an object on an overlapped image.

Next, explanations will be given for a variation example of overlapping images using the overlapping unit 160. The overlapping unit 160 may synthesize images by superposing images P1 and P2 on an area near the boundary so that a rupture made near the boundary on the top image is not noticeable. Hereinafter, an area in which images P1 and P2 are to be synthesized, i.e., a synthesizing area, will be explained before explaining a process performed by the overlapping unit 160.

First, explanations will be given for a synthesizing area in which two images P1 and P2 that are offset in a direction along one dimension, i.e., in the right and left directions or in the up or down directions, are overlapped. As shown in FIG. 9A, when image P1 is on image P2, the area inward by a prescribed number of pixels (or by a prescribed width) from the boundary on the image-P1 side of the common area is the synthesizing area. Similarly, as shown in FIG. 9B, when image P2 is on image P1, the area inward by a prescribed number of pixels from the boundary on the image-P2 side of the common area is the synthesizing area.

Next, the synthesizing area made when images P1 and P2 that are offset in directions along two dimensions, i.e., the right and left directions and the up and down directions, are to be overlapped will be explained. As shown in FIG. 10A, when image P2 is on image P1, the area inward by a prescribed number of pixels from the boundary on the image-P2 side of the common area (the shaded area) is the synthesizing area. As shown in FIG. 10A, when the two images are offset in directions along two dimensions, the synthesizing area is L-shaped. FIG. 10A shows a case where image P2 is offset from image P1 to the down right direction, however, the same explanations can be applied to a case where image P1 is offset from image P2 to the down right direction.

When image P1 is on image P2 as shown in FIGS. 10B and 10C, the area inward by a prescribed number of pixels from the boundary of the common area (the shaded area) is the synthesizing area.

The number of pixels that should be between the synthesizing area and the boundary, i.e., the width of the synthesizing area, varies depending upon the size of the entire image.

Figure 13:
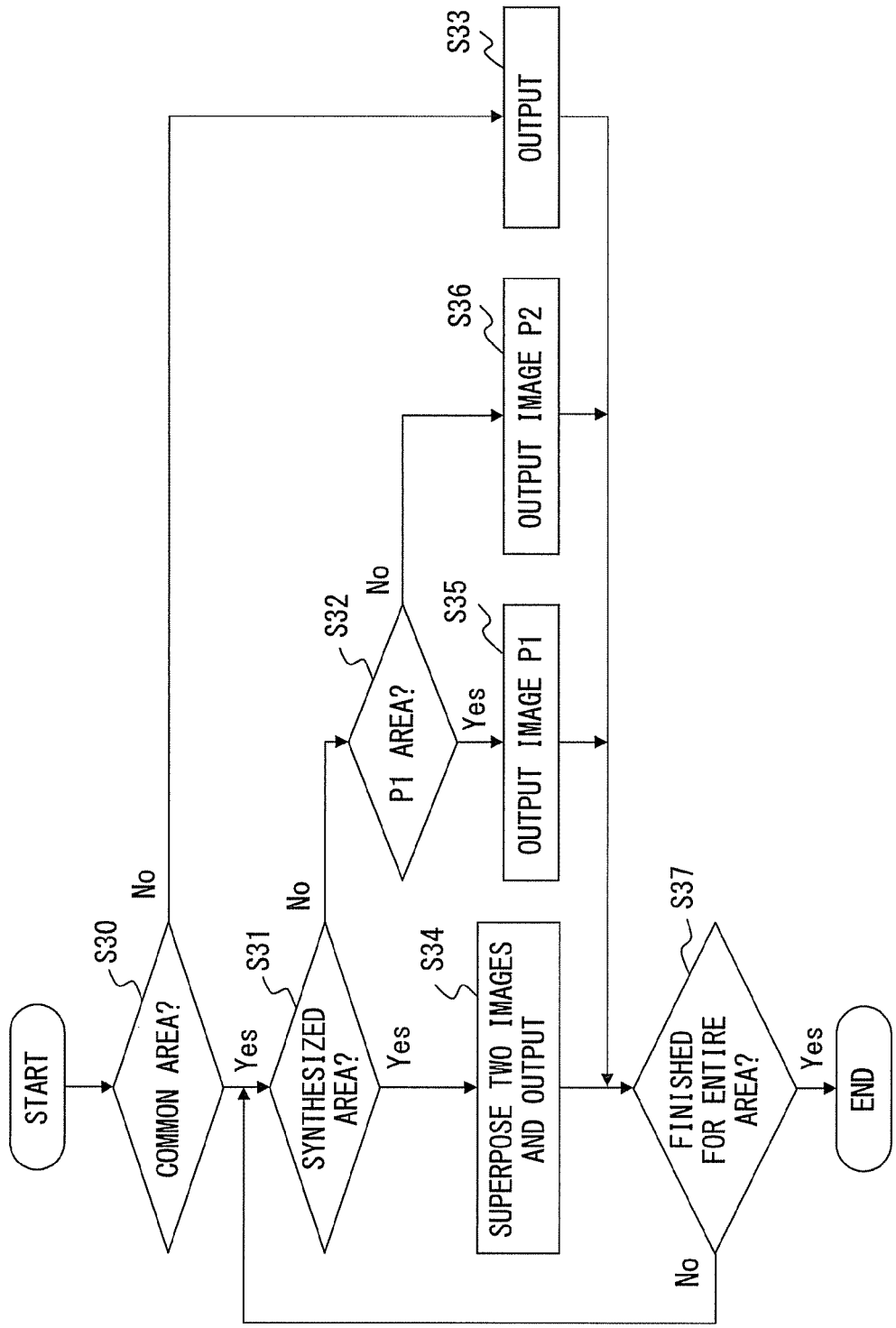
FIG. 13 is a flowchart of a process of synthesizing two images.

Next, explanations will be given for a flow of a process performed by the overlapping unit 160 to synthesize images P1 and P2, by referring to FIG. 13. This process corresponds to step S6 in FIG. 3. In this explanation, the overlapping unit 160 is assumed to output a result of overlapping two images to an output unit (not shown).

First, two images and a result of determination made by the top-and-bottom determination unit 150 are input to the overlapping unit 160. The overlapping unit 160 determines whether or not a certain pixel is in the common area on the basis of the pixel coordinate information of the two input images. When the overlapping unit 160 determines that the pixel is in the common area (Yes in step S30), it further determines whether or not that pixels is in the synthesizing area (step S31).

When the overlapping unit 160 determines that the pixel is not in the common area (No in step S30), it outputs the pixel at those coordinates together with the coordinates after the overlapping (step S33). Thereby, image P1 is used for a portion that was image P1 before the overlapping, and image P2 is used for a portion that was image P2 before the overlapping.

In step S31, when the overlapping unit 160 determines that the coordinates are in the synthesizing area (Yes in step S31), it obtains the pixels corresponding to each other at those coordinates in images P1 and P2, and superposes those two pixels (step S34). Thereafter, the overlapping unit 160 outputs the pixel resulting from that superposition and the coordinates of the pixel after the overlapping.

In step S31, when the overlapping unit 160 determines that the coordinates are not in the synthesizing area (No in step S31) and also when image P1 is used in the common area after overlapping on the basis of the coordinate information and the result of determination of the overlapping pattern made by the top-and-bottom determination unit 150 (Yes in step S32), the overlapping unit 160 outputs the pixel from image P1 together with the coordinates after the overlapping (step S35). Alternatively, when image P2 is used in the common area after the overlapping (No in step S32), the overlapping unit 160 outputs the pixel from image P2 together with the coordinates after the overlapping (step S36).

When the overlapping unit 160 has performed those processes on all input pixels (step S37), it terminates the process.

It is also possible to employ a configuration in which when the overlapping unit 160 superposes and synthesizes images P1 and P2, the synthesizing ratio of superposing the images is varied depending upon the distance between the boundary of the image and the pixel. FIG. 14 shows an example of variation in a synthesizing ratio between images P1 and P2 with respect to the distance from the boundary made by the overlapping in a case when images P1 and P2 are offset to the right and left directions. Note that in FIG. 14, image P1 is smaller than image P2, but this is for clearly representing that those two images are overlapped, and they do not need to be different in size.

In FIG. 14, image P2 is on image P1, and accordingly, the boundary on image P2 appears on the overlapped image. In such a case, it is possible to set 1:0 as the synthesizing ratio between image P1 and image P2 on the image-P2-side boundary, and to set 0:1 as the synthesizing ratio between image P1 and image P2 on the synthesizing-area boundary. It is also possible to gradually decrease the synthesizing ratio of image P1 from one to zero in the area between the image-P2-side boundary and the synthesizing-area boundary, and to gradually increase the synthesizing ratio of image P2 from zero to one. FIG. 14 shows an example of changing the synthesizing ratios of images P1 and P2 linearly (using linear functions); however, other functions can be used.

Figure 15B:
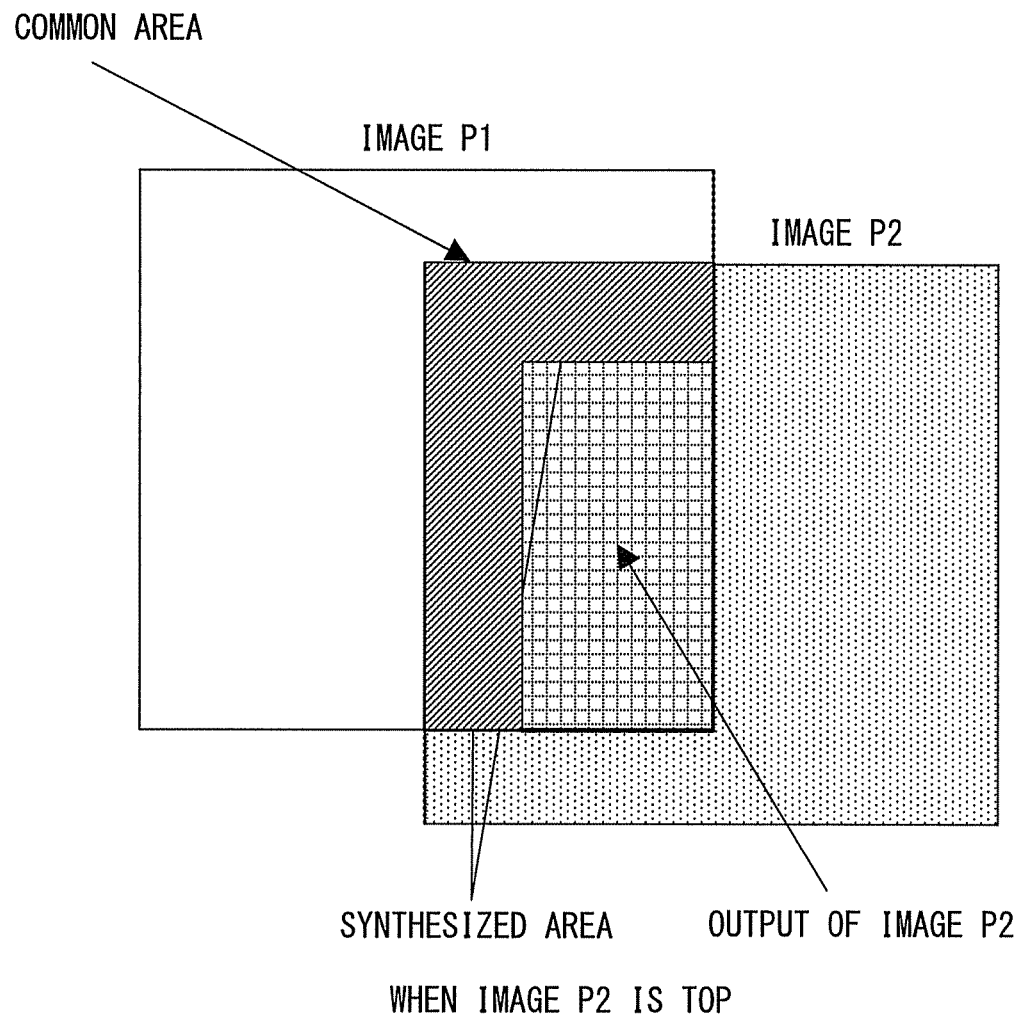
FIG. 15B is a (second) diagram illustrating results of overlapping and synthesizing images P1 and P2 in a synthesizing area.

Results of overlapping and synthesizing images P1 and P2 in the synthesizing area will be explained by referring to FIGS. 15A and 15B. FIGS. 15A and 15B show results of overlapping images when image P2 is offset from image P1 to the down right direction. FIG. 15A shows a case where image P1 is on image P2. In such a case, the area near the image-P1-side boundary of the common area is the synthesizing area. The synthesizing ratio of image P2 on the image-P1-side boundary is decreased to zero with decreasing distance to the synthesizing-area boundary. Consequently, as shown in FIG. 15A, the area near the boundary between image P2, which is colored in dark gray, and image P2, which is colored in white, gradually changes from dark gray to light gray, and finally to white. As described above, when images P1 and P2 are to be overlapped, the overlapping unit 160 overlaps and synthesizes images P1 and P2, and accordingly ruptures appearing near the boundary between the images can be made unnoticeable.

In FIG. 15B, image P2 is on image P1. In such a case, in contrast to FIG. 10A, the area near the image-P2-side boundary in the common area is the synthesizing area, and the synthesizing ratio of image P1 on the image-P2-side boundary decreases to zero with decreasing distance to the boundary of the synthesizing area. As shown in FIG. 15B, the area near the boundary between image P1, which is in white, and image P2, which is in dark gray, gradually changes in color from white to light gray and finally to dark gray, making the boundary unnoticeable.

As described above, in this variation example, the overlapping unit 160 superposes and synthesizes images P1 and P2 in the area near the boundary so that unnatural ruptures are not made near the boundary. The image synthesizing apparatus 100 determines, on the basis of the coincidence degrees before superposing images P1 and P2, which of such images is to be the top when they are overlapped so that the problem of duplexing can be made to be unlikely to occur in the common area. The overlapping unit 160 overlaps the two images on the basis of that determination, and thereafter superposes those images near the boundary made by the overlapping. Accordingly, the image synthesizing apparatus 100 makes it possible to avoid the problem of duplexing even when images near the boundary are overlapped.

Next, an image synthesizing apparatus 200 according to the second embodiment will be explained. The image synthesizing apparatus 200 according to the present embodiment overlaps and synthesizes plural still images shot at positions offset by a prescribed width. In order to offset the positions by a prescribed width, it is possible to provide a pole to an image shooting apparatus so that the image shooting apparatus is turned at a prescribed angle on that pole, or to shoot images with the shooting person turning his/her body.

When this is done, the image synthesizing apparatus 200 outputs, to an image shooting apparatus connected to the image synthesizing apparatus 200, supplement information used for shooting an image by applying a prescribed-width offset to the image shot previously. The image synthesizing apparatus 200 and the image shooting apparatus may have a communication function to communicate with each other so that the image synthesizing apparatus 200 can transmit supplement information to the image shooting apparatus. Examples of the image shooting apparatus include a still camera and a video camera. The image shooting apparatus may be included in a mobile phone, a PDA (Personal Digital Assistant), a personal computer, or the like.

FIG. 16 shows a configuration of the image synthesizing apparatus 200 having a function of outputting or transmitting supplement information to an image shooting apparatus. As shown in FIG. 16, the image synthesizing apparatus 200 includes an offsetting amount storing unit 210, image-shooting supplement information 220, a coincidence-degree calculation unit 110, a top-and-bottom determination unit 150, and an overlapping unit 160.

The offsetting amount storing unit 210 stores a width that is prescribed as an offsetting amount. This offsetting amount may be set by users, or can be set as a default setting of the device.

The image-shooting supplement information 220 generates, on the basis of a previously shot image (first image) and the offsetting amount, supplement information used for displaying, on the viewfinder of an image shooting apparatus, the edges of the first image and a prescribed width as an offsetting amount, and thereafter, the image-shooting supplement information 220 outputs or transmits the supplement information to the image shooting apparatus.

On the basis of the supplement information, the image shooting apparatus superposes the edges of the first image and the line or frame indicating the offsetting amount on the viewfinder on which the shooting object has been output. By using the line or frame superposed on the viewfinder, the shooting person, when shooting the second and subsequent images, can shoot the next image, which is offset by a prescribed width from the first image.

The shot second image is input to the image synthesizing apparatus 200. The coincidence degree calculation unit 110, the top-and-bottom determination unit 150, and the overlapping unit 160 overlap the first and the second images. This overlapping process is as has already been explained.

Hereinafter, a flow of processes performed by the image synthesizing apparatus 200 will be explained by referring to FIG. 17. As shown in FIG. 17, the second embodiment executes steps S40 and S41 instead of step S1 in the first embodiment.

First, the user uses the image shooting apparatus to shoot a first image. The image shooting apparatus transmits or outputs that first image to the image synthesizing apparatus 200 (step S40). On the basis of the first image and the offsetting amount stored in the image-shooting supplement information 220, the image synthesizing apparatus 200 calculates the coordinates of a frame indicating the edges of the first image and of a line indicating the position apart by a prescribed width from that frame, and outputs or transmits to the image shooting apparatus the calculation result as supplement information.

On the basis of the supplement information, the image shooting apparatus superposes the frame indicating the edges of the first image and the line indicating the offsetting amount on the viewfinder on which the shooting object has been output. When shooting the second image, the user shoots an images that is offset by a prescribed width from the first image, on the basis of the frame or line superposed on the viewfinder, and the second image that has been shot is output or transmitted to the image synthesizing apparatus 200 (step S41).

Next, in and after step S2, processes are performed for overlapping the first and second images as images P1 and P2, respectively. The processes in and after step S2 are similar to those in the first embodiment, and explanations thereof will be omitted.

As described above, the image synthesizing apparatus 200 has the merit that it can prepare supplement information that can be used for shooting second images, in addition to the merit provided by the image synthesizing apparatus 100 according to the first embodiment. Thereby, it is possible to shoot plural images that are offset by a prescribed width.

Next, explanations will be given for the third embodiment. In the third embodiment, an offsetting amount is not prescribed, and an image synthesizing apparatus 300 calculates an offsetting amount between images P1 and P2, and overlaps images P1 and P2 after correcting the offset.

Figure 18:
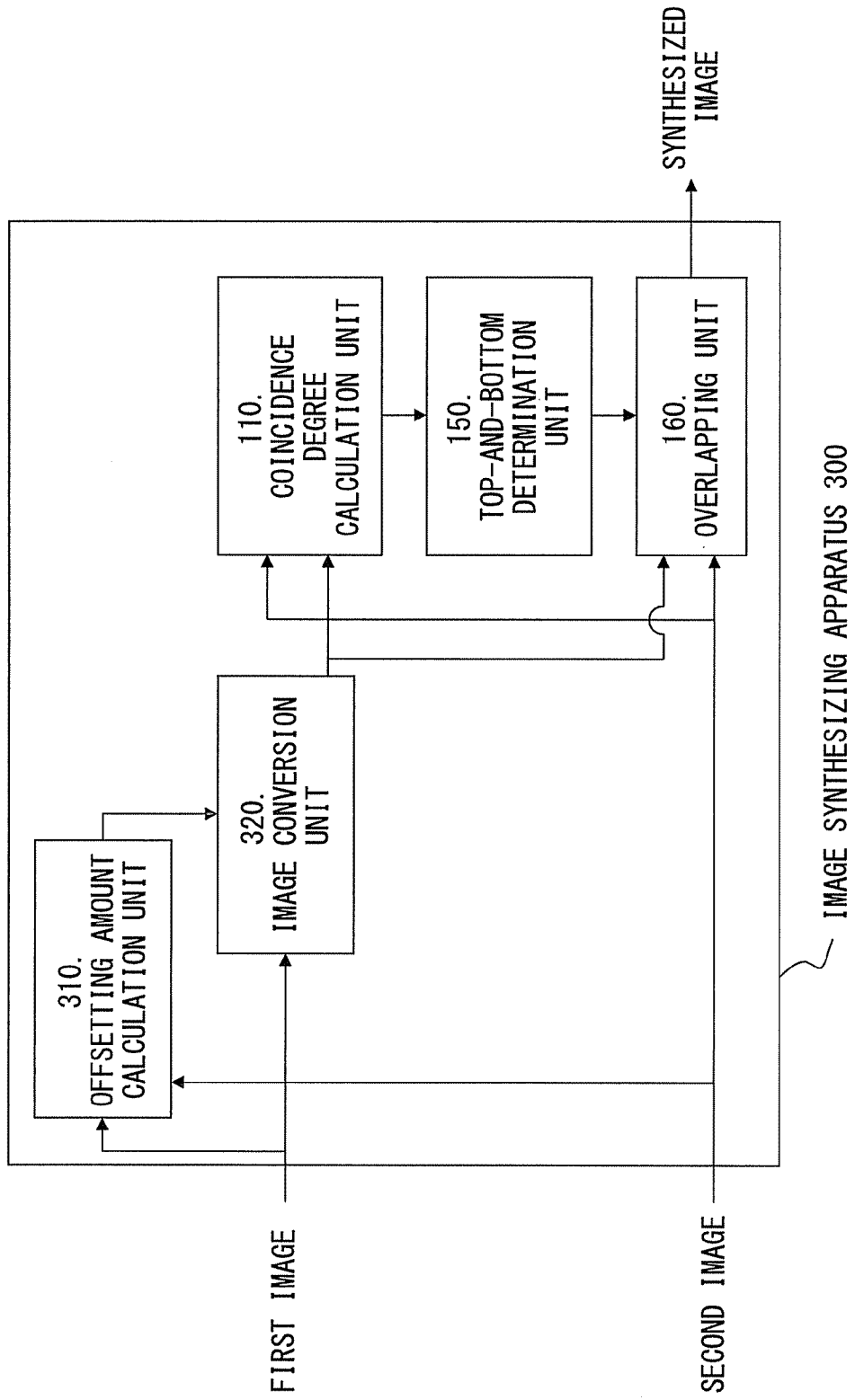
FIG. 18 shows a configuration of an image synthesizing apparatus according to the third embodiment.

The image synthesizing apparatus 300 according to the third embodiment of the present invention will be explained by referring to FIG. 18. As shown in FIG. 18, the image synthesizing apparatus 300 includes an offsetting amount calculation unit 310, an image conversion unit 320, the coincidence degree calculation unit 110, the top-and-bottom determination unit 150, and the overlapping unit 160.

The offsetting amount calculation unit 310 calculates the offsetting amount between input images P1 and P2. The image conversion unit 320 converts, on the basis of the offsetting amount, one of those two images so that the same object in them is positioned at the same coordinates. The coincidence degree calculation unit 110, the top-and-bottom determination unit 150, and the overlapping unit 160 have already been explained.

Figure 19:
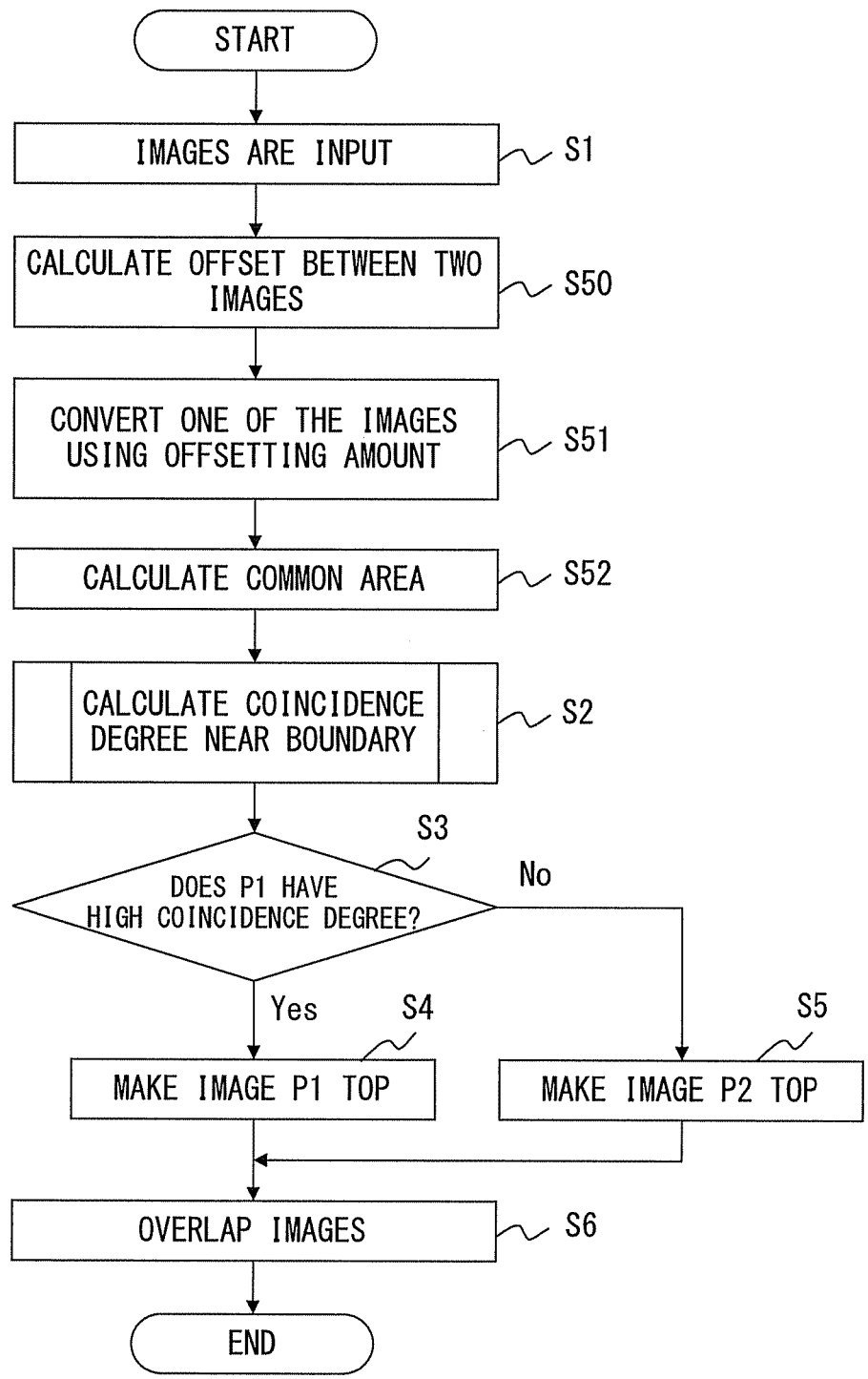
FIG. 19 is a flowchart of the processes performed by an image synthesizing apparatus according to the third embodiment.

Hereinafter, a flow of processes performed by the image synthesizing apparatus 300 will be explained by referring to FIG. 19. As shown in FIG. 19, the third embodiment executes steps S50 through S52 between steps S1 and S2, in contrast to the first embodiment shown in FIG. 3.

When two images P1 and P2 are input to the image synthesizing apparatus 300 (step S1), the offsetting amount calculation unit 310 calculates the offsetting amount between the two images (step S50). Next, the image conversion unit 320 converts one of images P1 and P2 on the basis of the calculated offsetting amount so that the offset is cancelled (step S51). Thereafter, the coincidence degree calculation unit 110 determines the common area on the basis of images P1 and P2 after the conversion (step S52), and executes steps S2 and subsequent steps. The processes in and after step S2 are as have already been explained.

Next, explanations will be given for the principle of calculation of an offsetting amount performed by the offsetting amount calculation unit 310.

The relationship between the coordinates (x, y) of a characteristic point in image P1 and the corresponding coordinates (x', y') in image P2 can be expressed by the following expression where $\Delta x$ and $\Delta y$ represent offsetting amounts.

$$x' = x + \Delta x$$

$$y' = y + \Delta y$$

Figure 20:
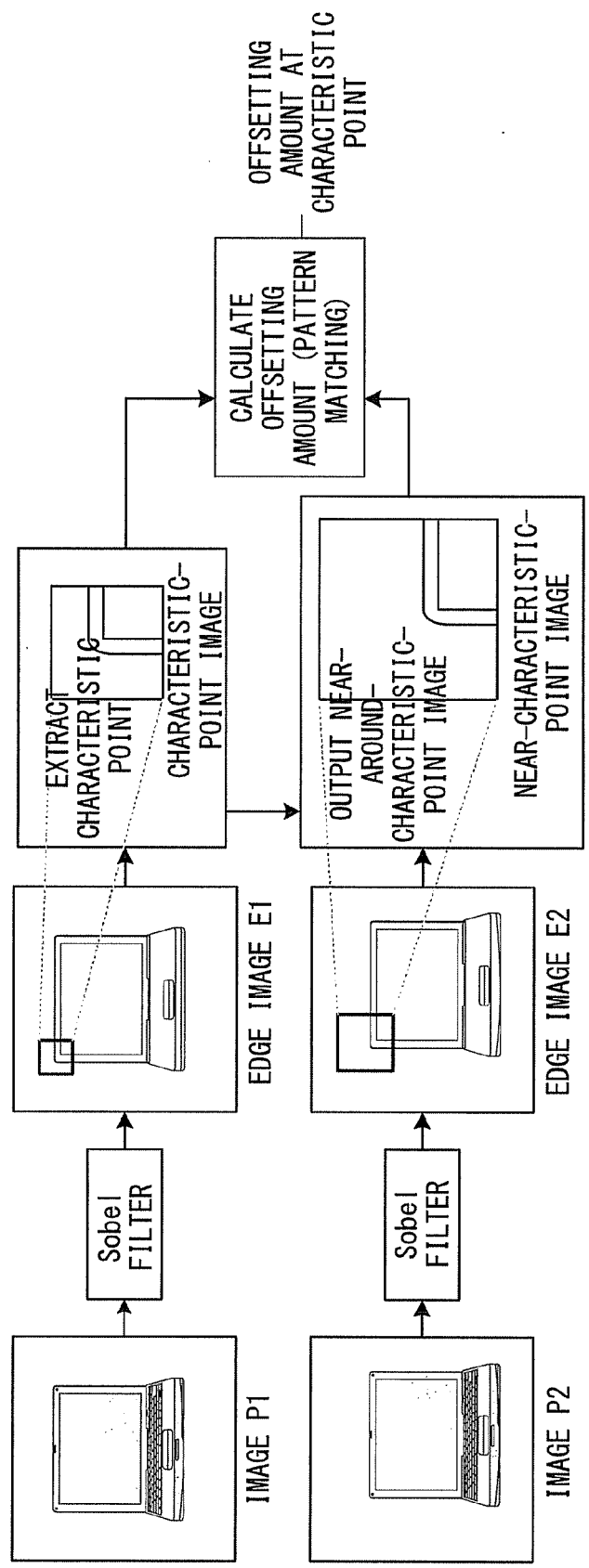
FIG. 20 is a diagram illustrating pattern matching of two images that are offset in the direction along one dimension.

When images are offset only parallelly, the values of $\Delta x$ and $\Delta y$ are fixed for any coordinates in the images. As an example of a method for detecting $\Delta x$ and $\Delta y$, pattern matching can be used. This pattern matching will be explained by using an example of a case in FIG. 20, where a personal computer is the object and images P1 and P2 are offset in the right and left directions.

First, the offsetting amount calculation unit 310 obtains edge images E1 and E2 by applying a Sobel filter to input images P1 and P2. A Sobel filter is for detecting outlines by carrying out a spatial first order derivative. Next, the offsetting amount calculation unit 310 extracts a characteristic point from one of edge images E1 and E2 (edge image E1 in this example), and extracts, from the other edge image (edge image E2 in this example), a portion near the coordinates of that characteristic point. Next, the offsetting amount calculation unit 310 overlaps the images near the characteristic points of edge images E1 and E2 (pattern matching) so as to calculate the offsetting amount.

More specifically, according to a pattern matching method, small-area-image data (referred to as a window hereinafter) in a background image is set, and the target image is scanned so as to detect areas that are equal in size to each other and that have the pixel values corresponding to those in this window. When such areas are detected, the difference between the coordinates in the window of the background window and those in the window of the target image is calculated, and the resultant values are handled as $\Delta x$ and $\Delta y$.

However, when the shooting person has shot images holding, with his/her hands, the image shooting apparatus instead of using a tripod stand, the second shot images often involve not only parallel movements but also rotation. In such a case, it is necessary to calculate the offsetting amounts $\Delta x$ and $\Delta Y$ separately for all characteristic points because the values of all offsetting amounts $\Delta x$ and $\Delta y$ differ depending upon the coordinates of characteristic points. An example of a method of obtaining the offsetting amounts for an entire image is Homography. Homography is a technique used for linking plural images (mosaicing), and is an algorithm for calculating offsetting amounts of an entire image from plural small areas (characteristic points) that are to be focused on in the image.

Explanations will be given for relationships between characteristic points when an image involves rotation, by referring to FIGS. 21A and 21B.

FIG. 21A shows an example where four characteristic points T1 through T4 are extracted from image PT1 and those respective points have the coordinates shown below.

$$T1 = (x1, y1)$$

$$T2 = (x2, y2)$$

$$T3 = (x3, y3)$$

$$T4 = (x4, y4)$$

Figure 21B:
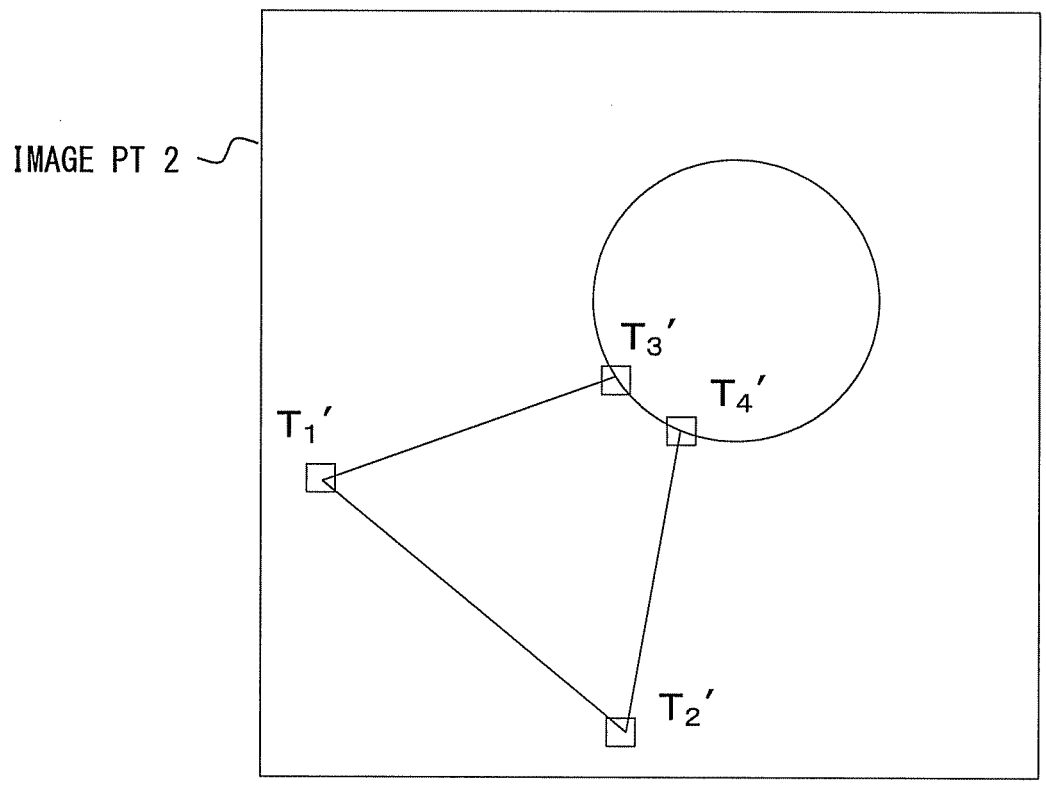
FIG. 21B is a (second) diagram illustrating relationships between characteristic points when an image involves rotation.

FIG. 21B shows an example where characteristic points T1' through T4' are extracted from image PT2, and those respective points have the coordinates below.

$$T1' = (x1', y1')$$

$$T2' = (x2', y2')$$

$$T3' = (x3', y3')$$

$$T4' = (x4', y4')$$

In such a case, the following equation is satisfied between a group T1 through T4 and a group T1' through T4'.

$$Tn = MTn'$$

In this equation, M represents a matrix, and is called a Homography Matrix. It is possible to calculate a Homography Matrix from a group of coordinates of characteristic points existing both in image PT1 and image PT2.

When the coordinates of a characteristic point in one of the images are supposed to be (x, y) and those in the other of the images are supposed to be (x', y'), the relationship between them can be expressed by the following matrix equation.

$$\begin{pmatrix} x' \\ y' \\ 1 \end{pmatrix} = k \begin{pmatrix} m_1 & m_2 & m_3 \\ m_4 & m_5 & m_6 \\ m_7 & m_8 & m_9 \end{pmatrix} \begin{pmatrix} x \\ y \\ 1 \end{pmatrix} \quad \text{[Expression 1]}$$

In the above matrix equation, k represents an arbitrary number except for zero, and m1 through m9 are arbitrary numbers. Using the coordinates of several groups of characteristic points makes it possible to calculate the parameters of K and m1 through m9. Performing Homography Matrix and matrix calculations of an arbitrary coordinate point (x,y) in image PT1 makes it possible to calculate a point (x', y') in image PT2 corresponding to image PT1 (x, y).

The offsetting amount calculation unit 310 calculates the offsetting amounts between two images as described above, and converts, on the basis of the calculated offsetting amount, one of images P1 and P2 so that the offset is cancelled. Thereafter, the coincidence degree calculation unit 110, the top-and-bottom determination unit 150, and the overlapping unit 160 determine, on the basis of the coincidence degree, a pattern for overlapping images P1 and P2, and overlaps them. Accordingly, the image synthesizing apparatus 300 makes it possible to overlap and synthesize images with the offset between them being cancelled beforehand even when such images are not position adjusted beforehand.

The image synthesizing apparatuses 100, 200, and 300 according to the present invention can be implemented in various forms. Hereinafter, implementations of the image synthesizing apparatuses 100, 200, and 300 according to the present invention will be explained.

The image synthesizing apparatuses 100, 200, and 300 can be implemented using, for example, a computer. Such a computer (not shown) is equipped with, for example, a CPU (Central Processing Unit), a memory device, and an input/output interface, all of which are connected to one another through a bus. Examples of an input/output interface include a liquid crystal panel, a touch panel, various types of buttons and dials, and the like.

In order to implement the image synthesizing apparatuses 100, 200, and 300 using a computer, a program is stored in the memory device for making the processor execute processes assigned to the respective units that constitute the image synthesizing apparatuses 100, 200, and 300. When the CPU uses the memory device to execute the program, the image synthesizing apparatuses 100, 200, and 300 are implemented.

Also, those image synthesizing apparatuses can be provided to various types of apparatuses. As an example of an apparatus to which those image synthesizing apparatuses are provided, an image shooting apparatus or the like such as a still camera or a video camera is explained.

Explanations will be given for a case where they are provided to an image shooting apparatus. Such an image shooting apparatus includes, in most cases, a lens, an image pick-up element, a controller (a non-general-purpose processor), a display device, a memory device, an input/output interface, and an auxiliary storage device. A lens forms an image of the object on the image pick-up element. An image pick-up element converts the formed image into electric signals so as to output the signals to the controller. A controller controls the memory device, the storage device, the interface, and the display device. The controller also stores, in the memory device, a program for executing processes assigned to the respective units that constitute the image synthesizing apparatus. The controller reads that program from the memory device so as to execute it. Thereby, the image shooting apparatuses to be provided to the image synthesizing apparatus are implemented.

It is also possible to produce a computer chip (micro controller) for controlling various types of interfaces to perform processes assigned to the respective units that constitute the image synthesizing apparatus so that the image shooting apparatus to be provided to the image synthesizing apparatus is implemented by the computer chip controlling the various devices that constitute the image shooting apparatus.

It is also possible to implement the image shooting apparatus including the image synthesizing apparatus by incorporating, into the image shooting apparatus (firmware), a memory device or the like that has recorded a program for making a processor execute processes assigned to the respective units constituting the image synthesizing apparatus.

Further, examples of an apparatus including an image shooting apparatus having the image synthesizing apparatus 100, 200, or 300 include a PDA (Personal Digital Assistant), a personal computer, and the like.

Hereinafter, loading of the program will be explained. Various methods can be used for obtaining a program that implements the function of the image synthesizing apparatuses explained in the above embodiments on a computer, an image shooting apparatus, a mobile phone, a PDA, or a like device having an image shooting apparatus.

It is possible, as an example, to store such a program as above in an external storage device connected to a device such as a computer or the like (a device having a processor) that is used for implementing the image synthesizing apparatus, and to load that program to the memory device as necessary.

It is also possible to employ a configuration in which a computer-readable storage medium stores the program beforehand, the program is read from that medium to an apparatus that is to implement the image synthesizing apparatus, the program is stored in the memory device or an external storage device, and the program is read to the CPU of the computer so as to be executed.

It is also possible to store the program to a storage device in a program server, and to download, via the input interface and a communication line, the program to an apparatus that is to implement the image synthesizing apparatus. In such a case, for example, the program server converts the program data expressing the program into program data signals, the program data signals are modulated by a modem into transmission signals, and the transmission signals are output to the communication line. The apparatus that receives the program uses a modem to demodulate the received transmission signals so as to obtain the program data signals, and converts the obtained program data signals in order to obtain the program data.

Also, when a digital line is used as the communication line (transmission medium) for connecting a transmitting computer and a receiving computer, program data signals can also be transmitted. A computer in a telephone station or the like may exist between a computer transmitting the program and a computer downloading that program.

According to the present invention, when plural images are to be overlapped and synthesized, a coincidence degree, which indicates the degree of coincidence between plural images in an area near the boundary of the common area, is calculated, a pattern for overlapping the plural images is determined on the basis of the coincidence degree, and the plural images are overlapped and synthesized on the basis of that pattern. Thereby, it is possible to avoid the duplexing of the object in the common area and unnatural ruptures on the boundary made by the overlapping while reducing the number of processes for the synthesizing.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention has (have) been described in detail, it should be understood that the various changes, substitutions, and alterations could be made hereto without departing from the spirit and scope of the invention.

What is claimed is:

1. An image synthesizing apparatus, comprising:
a common area determination unit configured to determine a common area which is included in both first and second images shot at different positions and whose boundary includes a first part common to a boundary of the first image and a second part common to a boundary of the second image;
a coincidence degree calculation unit configured to calculate a first coincidence degree which indicates a degree of coincidence between a first area within the common area of the first image and the first area within the common area of the second image, and to calculate a second coincidence degree which indicates a degree of coincidence between a second area within the common area of the first image and the second area within the common area of the second image; and
an image synthesizing unit configured to synthesize the first and second images using the common area included in the first image when the first coincidence degree is higher than the second coincidence degree, and to synthesize the first and second images using the common area included in the second image when the second coincidence degree is higher than the first coincidence degree, wherein first area is included within the common area and has a width within a prescribed width from the first part of the boundary of the common area, and the second area is included within the common area and has a width within the prescribed width from the second part of the boundary of the common area.

2. The image synthesizing apparatus according to claim 1, wherein:

the coincidence degree calculation unit calculates the first coincidence degree according to a first statistic of pixels in the first area of the first image and pixels in the first area of the second image, and the coincidence degree calculation unit calculates the second coincidence degree according to a second statistic of pixels in the second area of the first image and pixels in the second area of the second image.

3. The image synthesizing apparatus according to claim 2, wherein:

each of the first and second statistics is a statistic of brightness.

4. The image synthesizing apparatus according to claim 2, wherein:

the first statistic is a number of pixels in the first area of the first image with a pixel value from which a pixel value of a corresponding pixel in the first area of the second image differs by more than a prescribed value, and the second statistic is a number of pixels in the second area of the first image with a pixel value from which a pixel value of a corresponding pixel in the second area of the second image differs by more than the prescribed value.

5. The image synthesizing apparatus according to claim 2, wherein:

the first statistic is a cumulation of an absolute value of a difference between a pixel value of a pixel in the first area of the first image and a pixel value of a corresponding pixel in the first area of the second image, and the second statistic is a cumulation of an absolute value of a difference between a pixel value of a pixel in the second area of the first image and a pixel value of a corresponding pixel in the second area of the second image.

6. The image synthesizing apparatus according to claim 1, wherein:

when the first coincidence degree is higher than the second coincidence degree, the image synthesizing unit mainly uses the common area included in the first image in synthesizing the first and second images in the common area, and when the second coincidence degree is higher than the first coincidence degree, the image synthesizing unit mainly uses the common area included in the second image in synthesizing the first and second images in the common area.

7. The image synthesizing apparatus according to claim 1, wherein:

when the first coincidence degree is higher than the second coincidence degree, the image synthesizing unit synthesizes the first and second images so as to generate a synthesized image in which the first image appears in the first area, and when the second coincidence degree is higher than the first coincidence degree, the image synthesizing unit synthesizes the first and second images so as to generate a synthesized image in which the second image appears in the second area.

8. The image synthesizing apparatus according to claim 1, wherein:

when the first coincidence degree is higher than the second coincidence degree, the image synthesizing unit synthesizes the first and second images so as to generate a synthesized image in which the first image appears in the second area and the second part of the boundary of the common area is hidden by the first image appearing in the second area, and when the second coincidence degree is higher than the first coincidence degree, the image synthesizing unit synthesizes the first and second images so as to generate a synthesized image in which the second image appears in the first area and the first part of the boundary of the common area is hidden by the second image appearing in the first area.

9. The image synthesizing apparatus according to claim 1, further comprising:

a superposing unit configured to superpose the first and second images at least in the first or second area.

10. The image synthesizing apparatus according to claim 9, wherein:

the superposition unit superposes the first and second images in the first area when the first coincidence degree is higher than the second coincidence degree, and the superposition unit superposes the first and second images in the second area when the second coincidence degree is higher than the first coincidence degree.

11. The image synthesizing apparatus according to claim 1, further comprising:

an image-shooting supplement unit configured to generate supplement information according to an offsetting amount to be applied between the first image and the second image, and to output the supplement information to an image-shooting apparatus for shooting the first and second images.

12. The image synthesizing apparatus according to claim 1, further comprising:

an offsetting amount calculation unit configured to calculate an offsetting amount between the first and second images; and an image conversion unit configured to convert, according to the offsetting amount, at least one of the first and second images so that the offsetting amount is reduced, wherein:

the image synthesizing unit synthesizes the first and second images after the conversion.

13. An image-shooting apparatus, comprising:

the image synthesizing apparatus according to claim 1.

14. A mobile phone, comprising:

an image-shooting apparatus including the image synthesizing apparatus according to claim 1.

15. An image synthesizing method comprising:

determining a common area which is included in both first and second images shot at different positions and whose boundary includes a first part common to a boundary of the first image and a second part common to a boundary of the second image;

calculating a first coincidence degree which indicates a degree of coincidence between a first area within the common area of the first image and the first area within the common area of the second image;

calculating a second coincidence degree which indicates a degree of coincidence between a second area within the common area of the first image and the second area within the common area of the second image;

synthesizing the first and second images using the common area included in the first image when the first coincidence degree is higher than the second coincidence degree; and synthesizing the first and second images using the common area included in the second image when the second coincidence degree is higher than the first coincidence degree, wherein the first area is included within the common area and has a width within a prescribed width from the first part of the boundary of the common area, and the second area is included within the common area and has a width within the prescribed width from the second part of the boundary of the common area.

16. A non-transitory computer-readable storage medium storing an image synthesizing program to cause a computer to execute a process comprising:

determining a common area which is included in both first and second images shot at different positions and whose boundary includes a first part common to a boundary of the first image and a second part common to a boundary of the second image;

calculating a first coincidence degree which indicates a degree of coincidence between a first area within the common area of the first image and the first area within the common area of the second image;

calculating a second coincidence degree which indicates a degree of coincidence between a second area within the common area of to the first image and the second area within the common area of the second image;

synthesizing the first and second images using the common area included in the first image when the first coincidence degree is higher than the second coincidence degree; and synthesizing the first and second images using the common area included in the second image when the second coincidence degree is higher than the first coincidence degree, wherein the first area is included within the common area and has a width within a prescribed width from the first part of the boundary of the common area, and the second area is included within the common area and has a width within the prescribed width from the second part of the boundary of the common area.

* * * * *

UNITED STATES PATENT AND TRADEMARK OFFICE
CERTIFICATE OF CORRECTION

| | | |
|---|---|---|
| PATENT NO. | : 8,774,495 B2 | Page 1 of 1 |
| APPLICATION NO. | : 12/724871 | |
| DATED | : July 8, 2014 | |
| INVENTOR(S) | : Kimitaka Murashita et al. | |

It is certified that error appears in the above-identified patent and that said Letters Patent is hereby corrected as shown below:

In the Claims,

Column 21, Line 4, In Claim 1, after "wherein" insert -- the --.

Column 24, Line 7, In Claim 16, before "the" delete "to".

Signed and Sealed this
First Day of September, 2015

Michelle K. Lee
*Director of the United States Patent and Trademark Office*